United States Patent
Siddoway et al.

(10) Patent No.: US 9,445,615 B2
(45) Date of Patent: Sep. 20, 2016

(54) FRESH POTATO PRESERVATIVE AND METHOD OF USING SAME

(71) Applicant: PFM, LLC, Rexburg, ID (US)

(72) Inventors: Thane R. Siddoway, Rexburg, ID (US); John Ricks, Idaho Falls, ID (US)

(73) Assignee: PFM, LLC, Rexburg, ID (US)

( * ) Notice: Subject to any disclaimer, the term of this patent is extended or adjusted under 35 U.S.C. 154(b) by 0 days.

(21) Appl. No.: 13/933,687

(22) Filed: Jul. 2, 2013

(65) Prior Publication Data

US 2015/0010691 A1    Jan. 8, 2015

(51) Int. Cl.
| A23L 1/217 | (2006.01) |
| A23L 1/216 | (2006.01) |
| A23L 3/3508 | (2006.01) |
| A23L 3/3526 | (2006.01) |
| A23L 3/3544 | (2006.01) |
| A23L 3/358 | (2006.01) |

(52) U.S. Cl.
CPC ............ *A23L 1/2163* (2013.01); *A23L 3/3508* (2013.01); *A23L 3/358* (2013.01); *A23L 3/3526* (2013.01); *A23L 3/3544* (2013.01)

(58) Field of Classification Search
CPC ............. A23L 1/217; A23L 1/01; A23P 1/08
USPC .......... 426/615, 74, 102, 335, 321, 518, 637
See application file for complete search history.

(56) References Cited

U.S. PATENT DOCUMENTS

| 3,978,235 A | 8/1976 | Schiro |
| 4,336,273 A | 6/1982 | Lee |
| 4,649,057 A | 3/1987 | Thomson |
| 4,818,549 A | 4/1989 | Steiner |
| 4,911,940 A | 3/1990 | Steiner |
| 4,988,523 A | 1/1991 | Gardner |
| 5,126,153 A | 6/1992 | Beck |
| 5,217,736 A * | 6/1993 | Feeney et al. ............. 426/102 |
| 5,346,712 A | 9/1994 | Cherry |
| 5,376,391 A * | 12/1994 | Nisperos-Carriedo .. A23B 7/16 426/102 |
| 5,389,389 A * | 2/1995 | Beck .......................... 426/269 |
| 5,645,880 A * | 7/1997 | McArdle ..................... 426/327 |

(Continued)

FOREIGN PATENT DOCUMENTS

| CN | 101223910 A | 7/2008 |
| EP | 0859551 | 2/2002 |

(Continued)

OTHER PUBLICATIONS

"Ball Fruit-Fresh Produce Protector", 2012, www.wegmans.com/webapp/wcs/stores/servlet/ProductDisplay?productID+356982&s, pp. 1 and 2.

*Primary Examiner* — Helen F Heggestad
(74) *Attorney, Agent, or Firm* — Morriss O'Bryant Compagni, PC

(57) ABSTRACT

A fresh potato preservative and method of using the preservative for fresh cut potatoes that significantly extend the shelf life of fresh cut potatoes are provided. The fresh potato preservative preserves the texture, flavor, appearance, and color of the fresh potatoes, particularly exposed surfaces of the fresh potatoes that have been cut, in particular by reducing oxidation of the exposed cut surfaces of the potatoes. The preservative includes the ingredients of sodium chloride, citric acid, ascorbic acid, calcium chloride, sodium acid pyrophosphate, potassium sorbate and a protein-based composition.

16 Claims, 24 Drawing Sheets

(56) References Cited

U.S. PATENT DOCUMENTS

| | | |
|---|---|---|
| 5,840,356 A | 11/1998 | Swensen |
| 5,922,382 A | 7/1999 | Powrie |
| 5,925,395 A | 7/1999 | Chen |
| 5,939,117 A | 8/1999 | Chen |
| 5,945,146 A | 8/1999 | Twinam |
| 5,972,397 A * | 10/1999 | Durance et al. .............. 426/242 |
| 6,403,139 B1 | 6/2002 | Sardo |
| 6,749,875 B2 | 6/2004 | Selleck |
| 6,977,090 B2 | 12/2005 | Petcavich |
| 7,931,926 B2 | 4/2011 | Lidster |
| 8,101,221 B2 | 1/2012 | Chen |

FOREIGN PATENT DOCUMENTS

| | | |
|---|---|---|
| WO | 9412041 | 6/1994 |
| WO | 9723138 | 7/1997 |
| WO | 9907230 | 2/1999 |

* cited by examiner

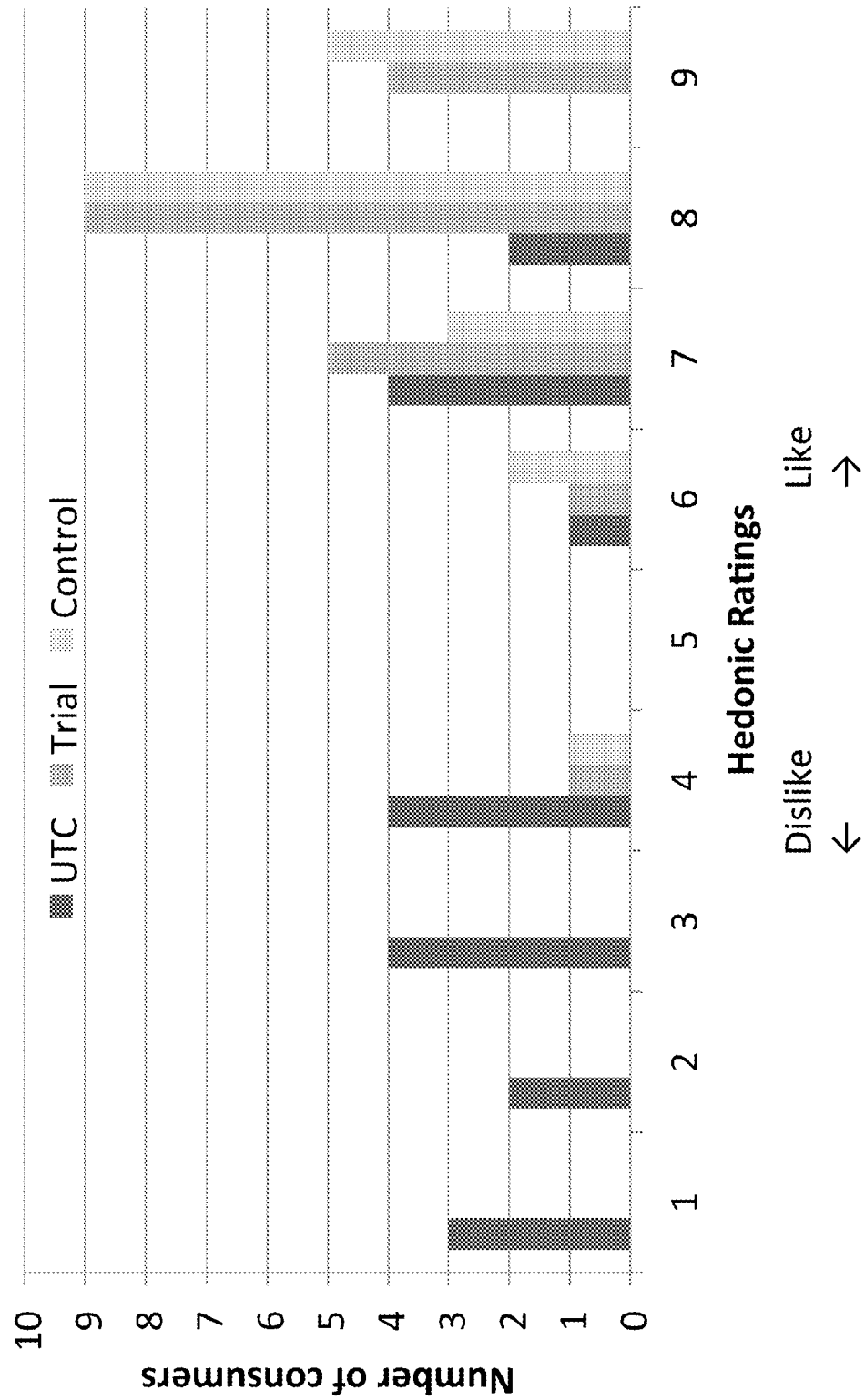

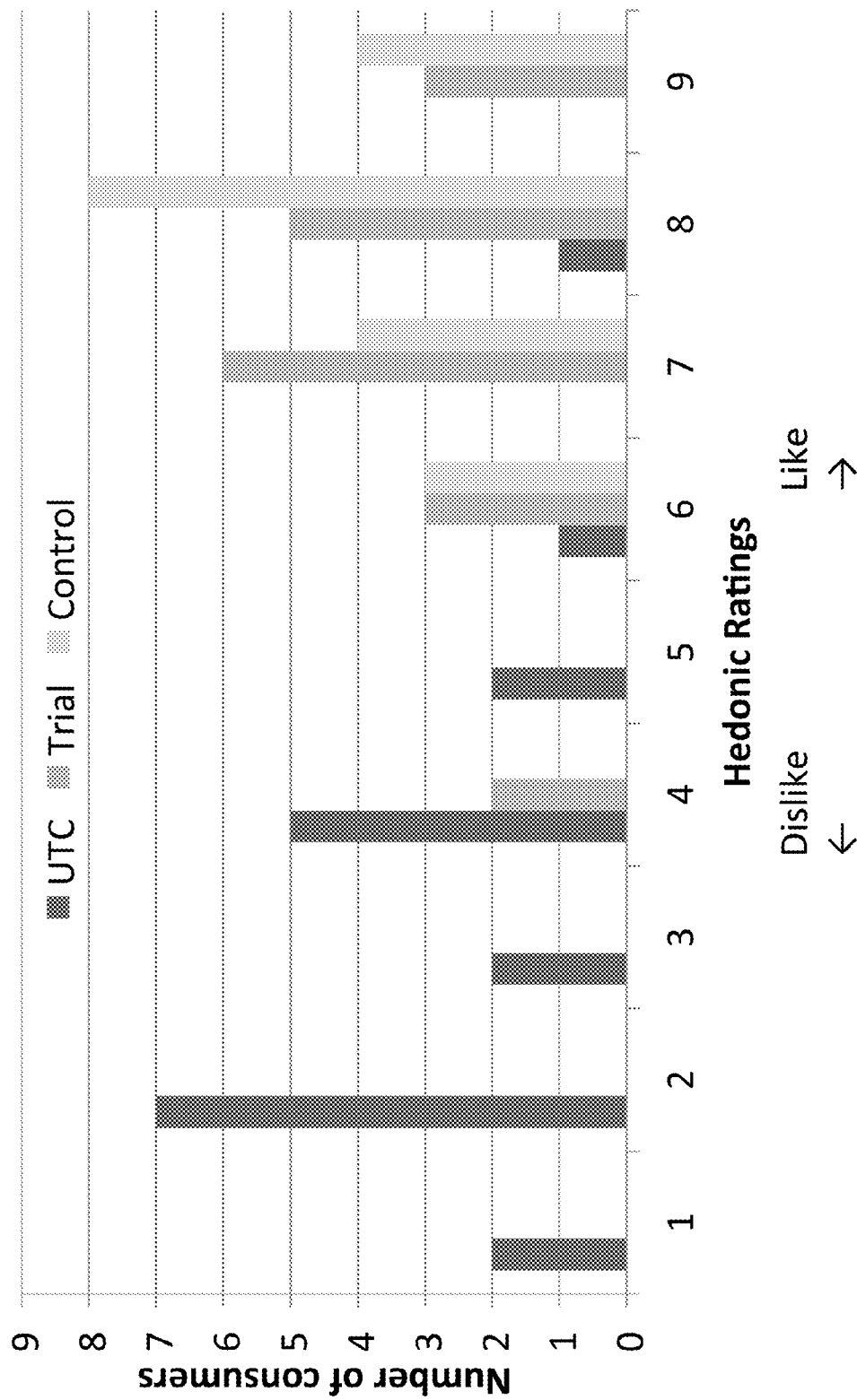

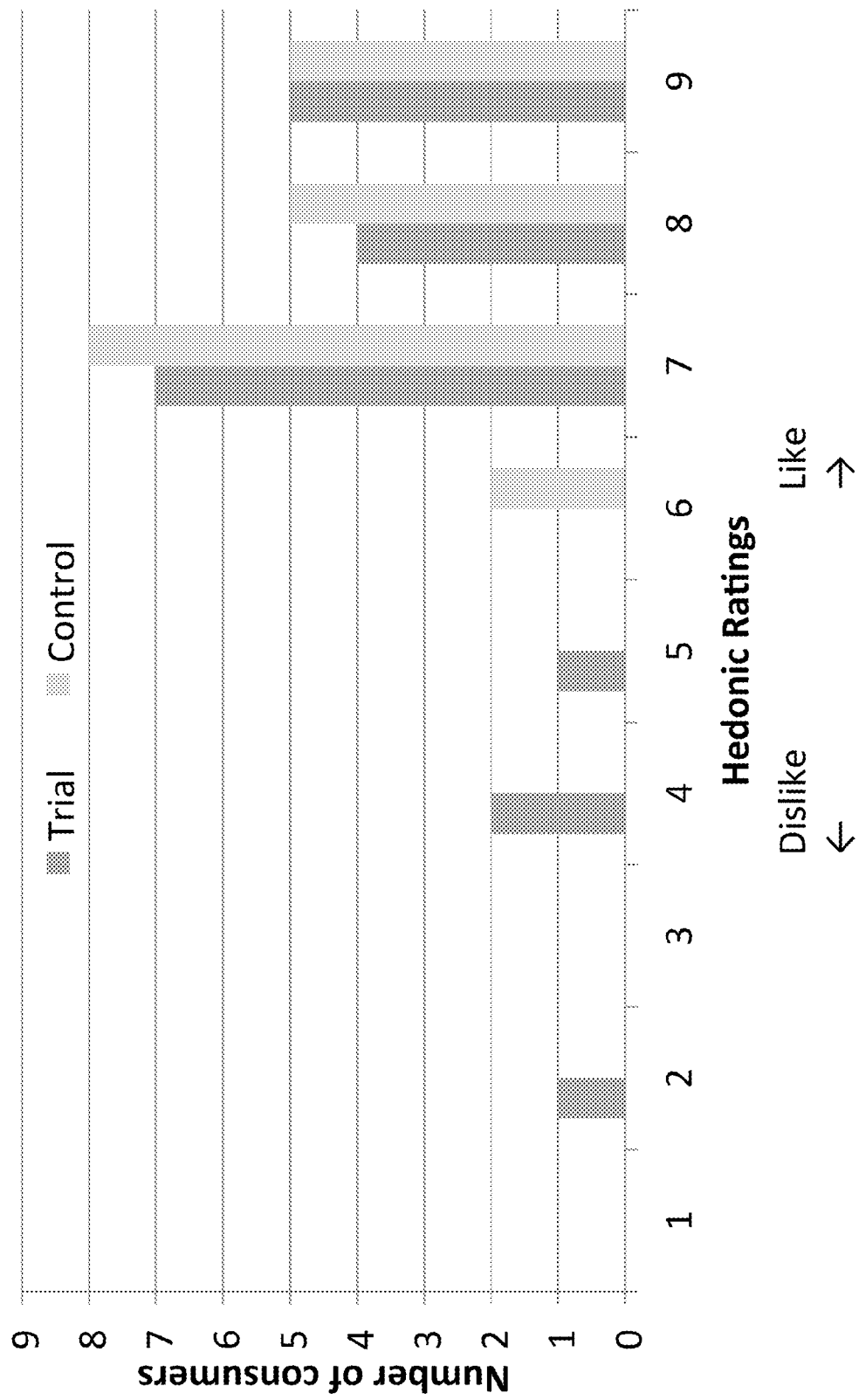

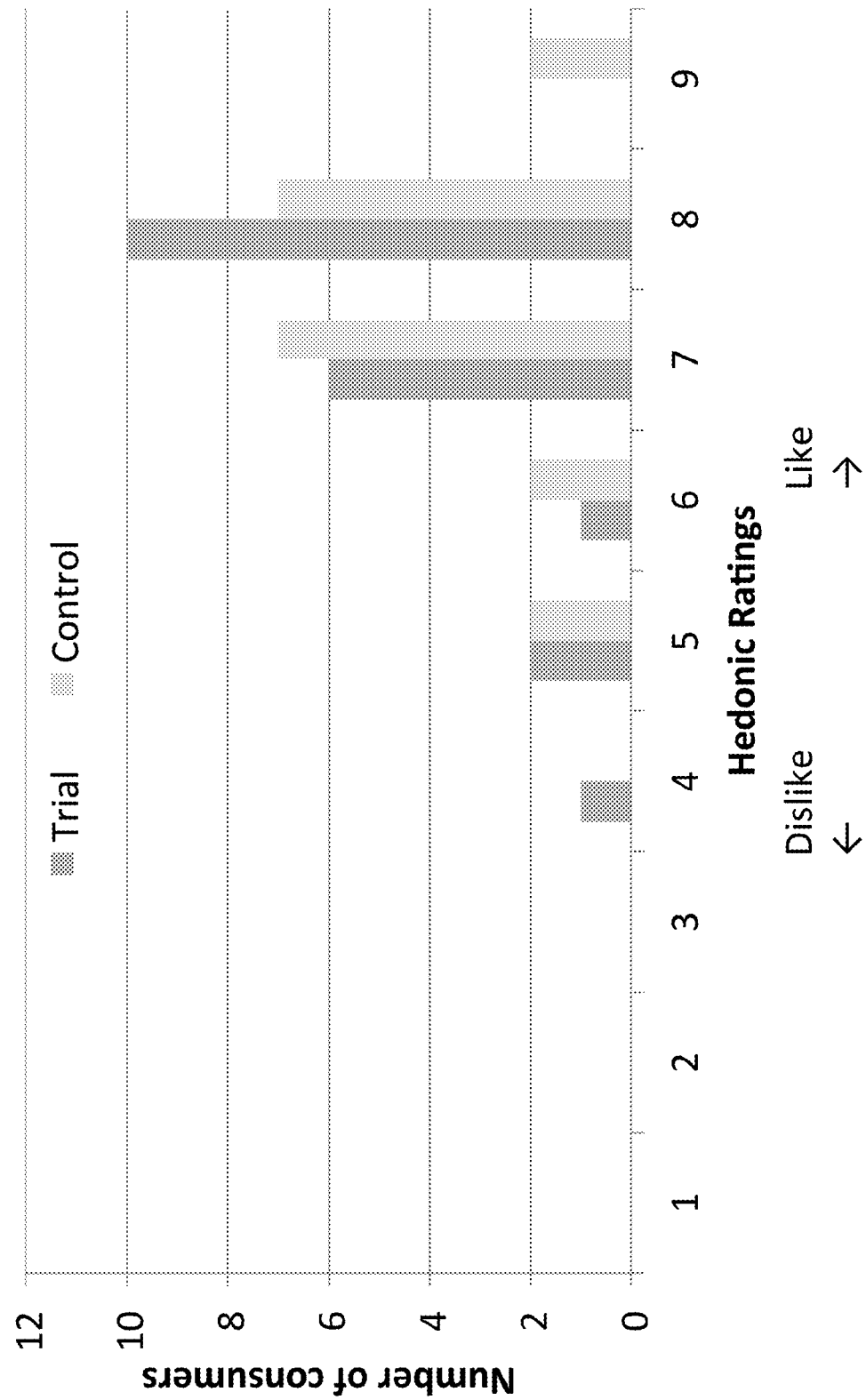

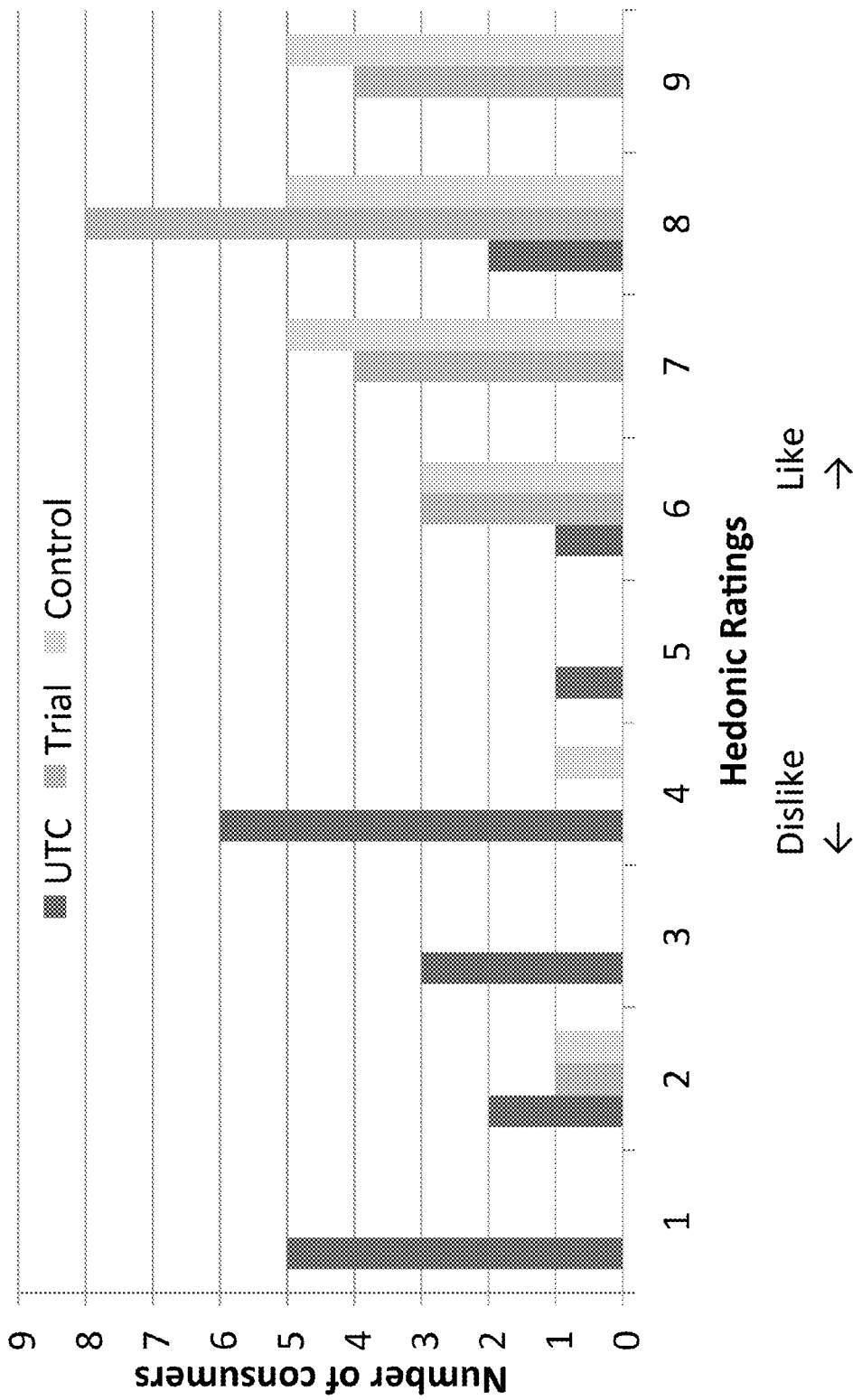

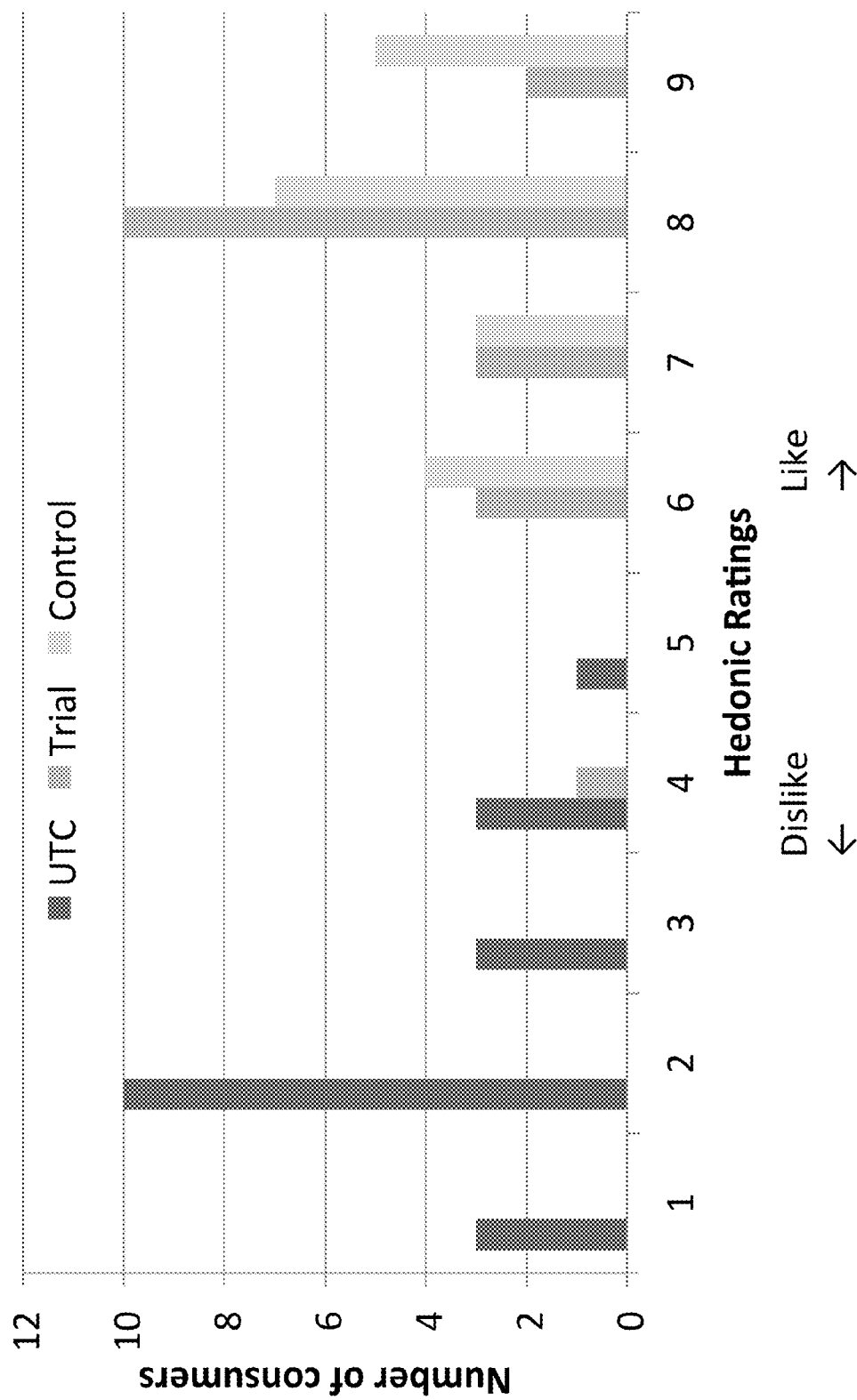

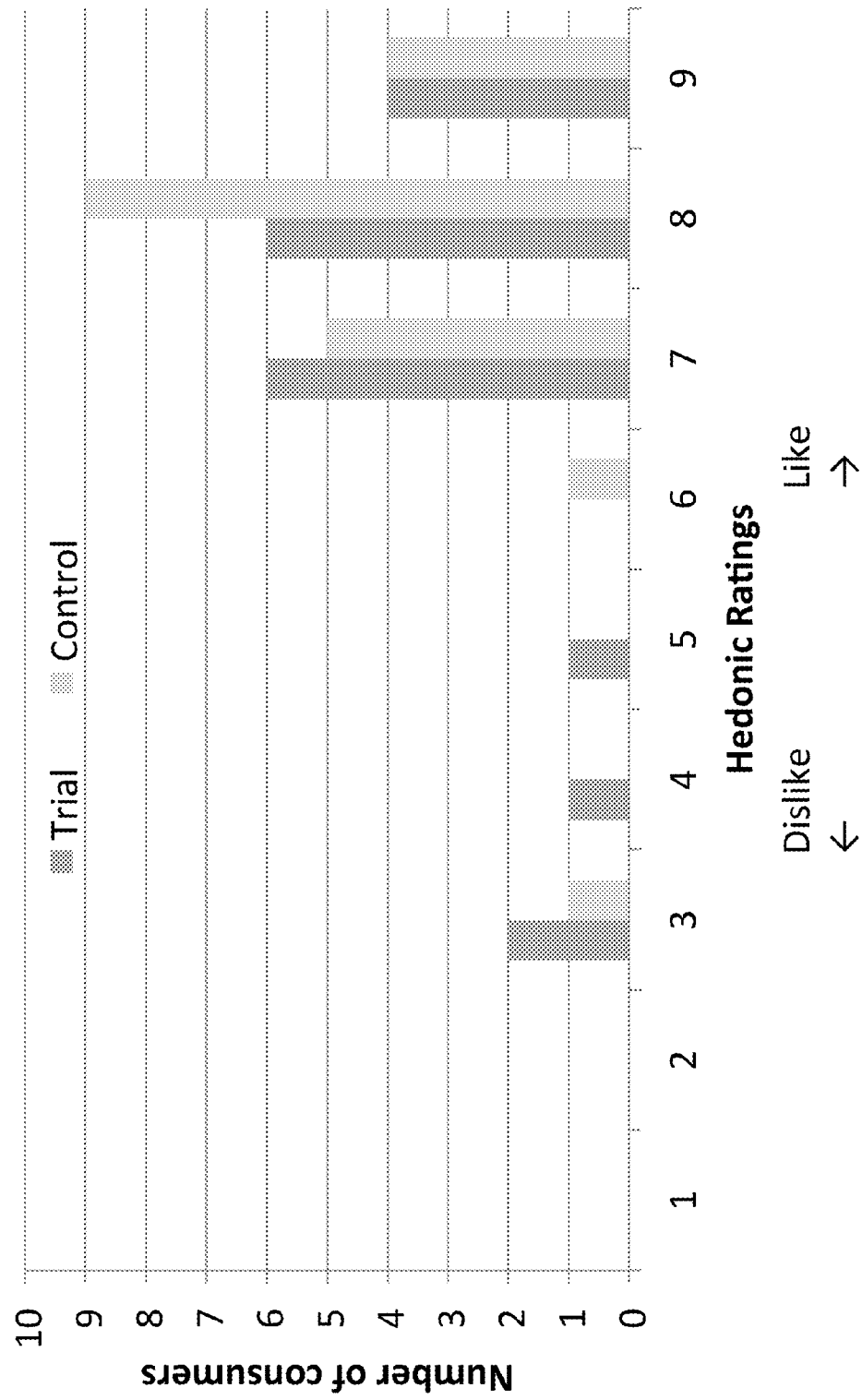

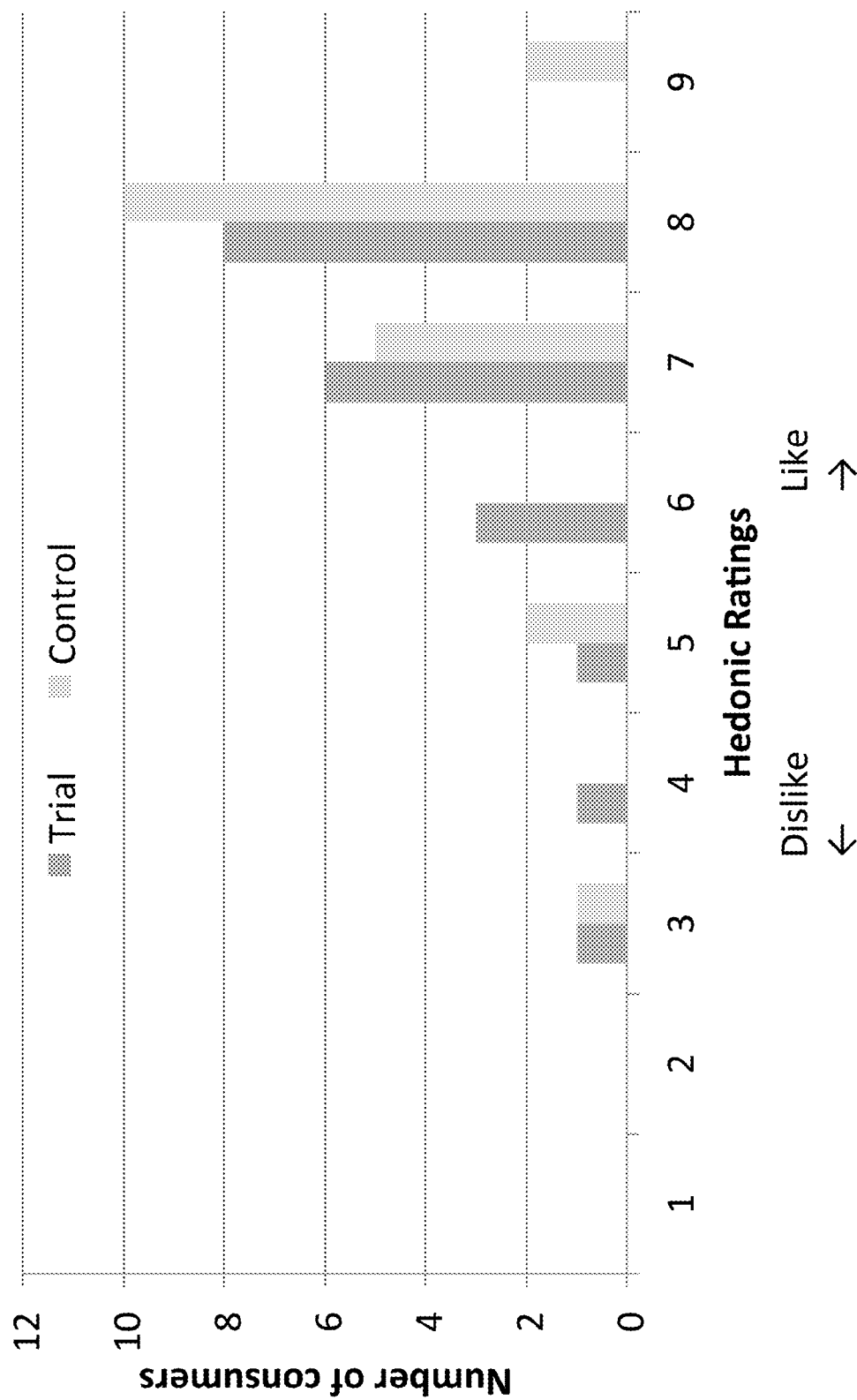

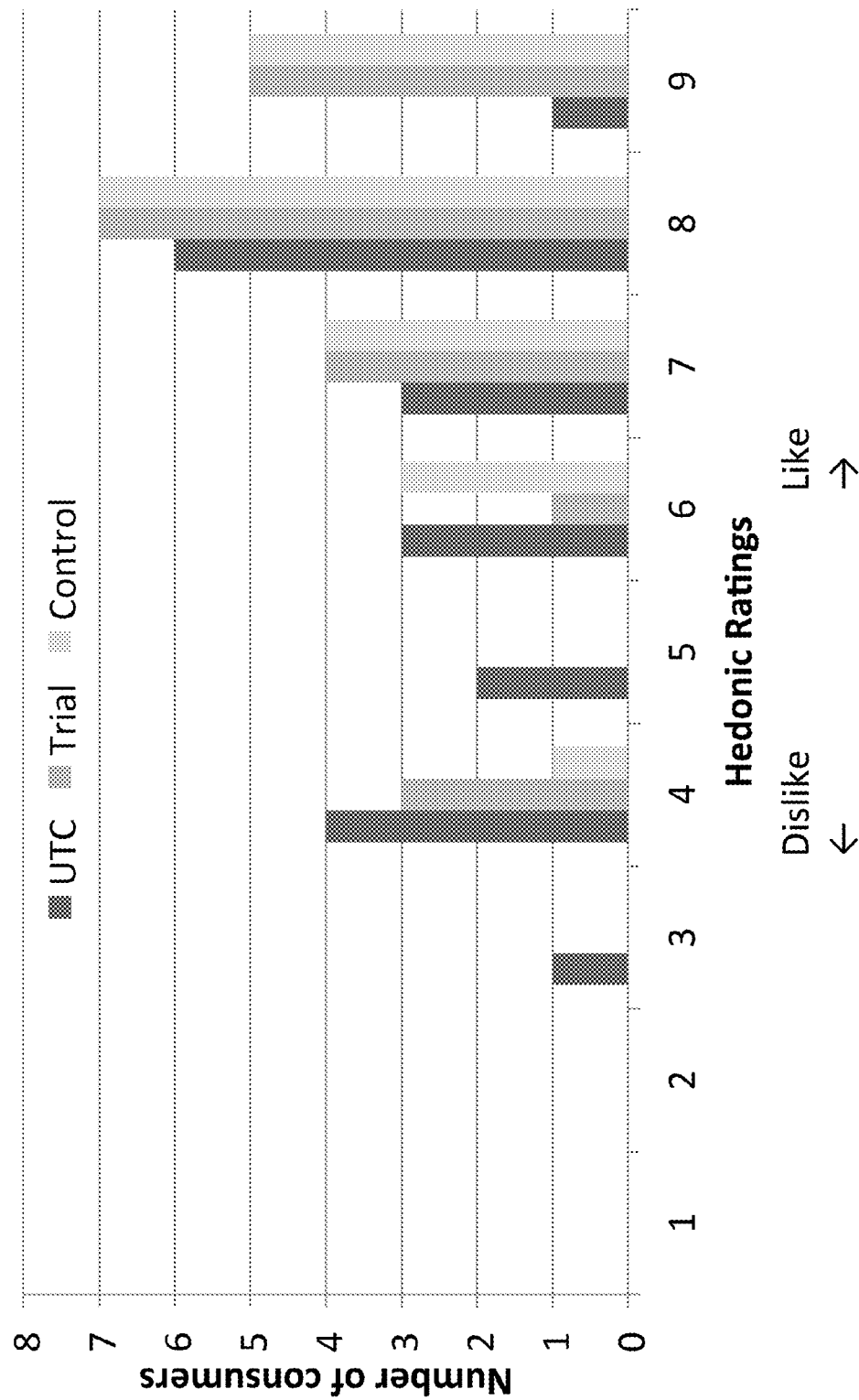

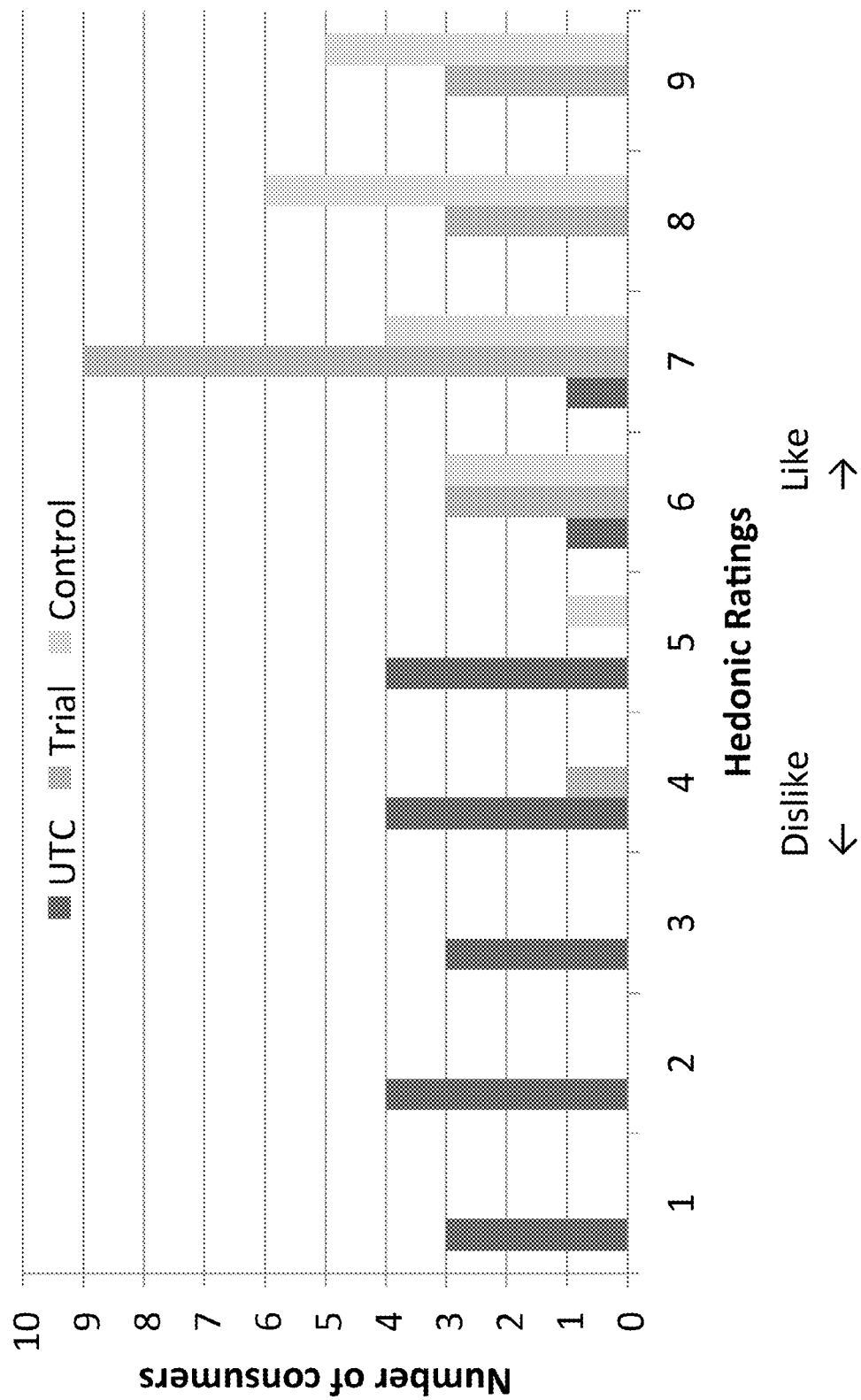

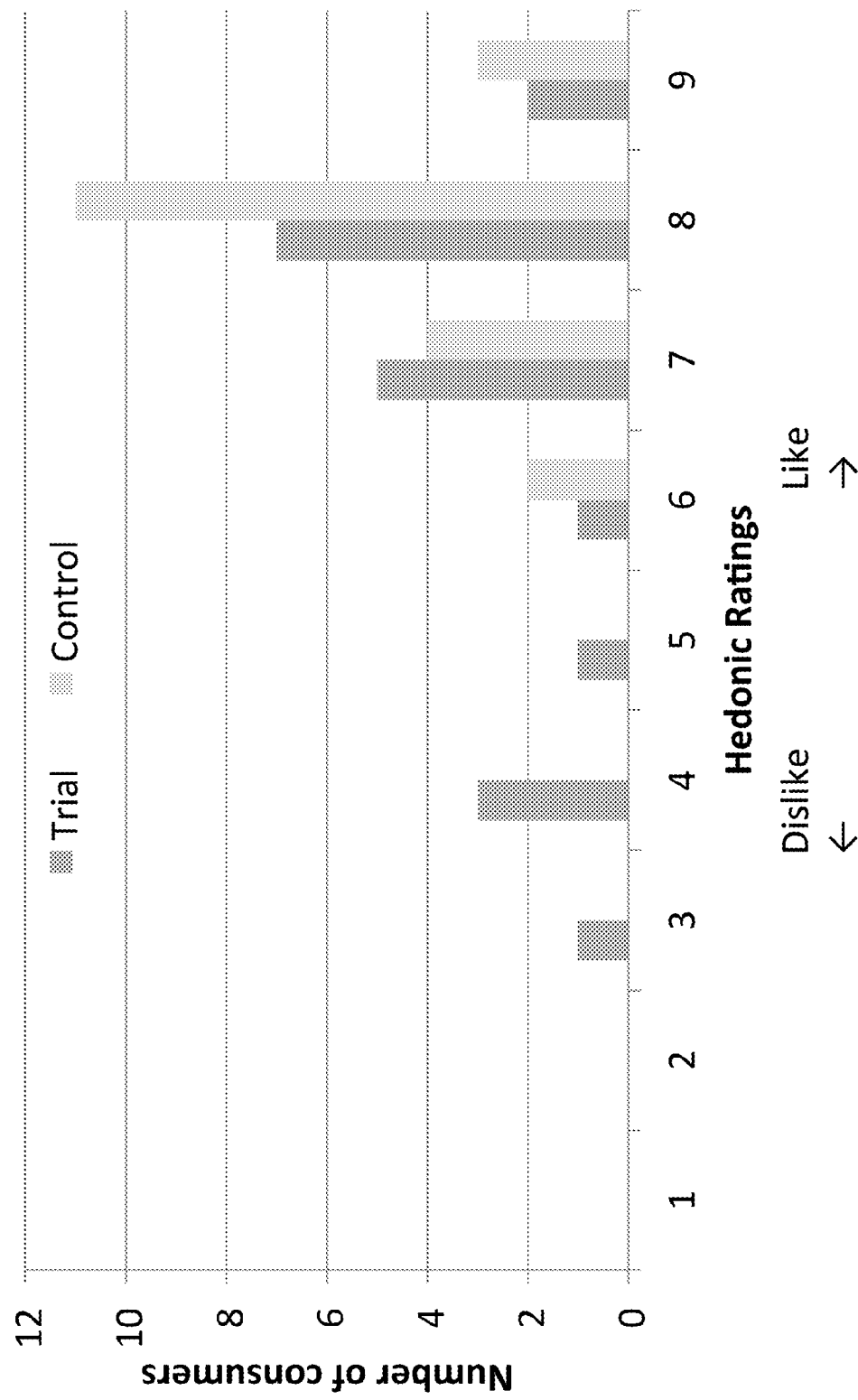
Figure 11. Raw Fry Appearance Acceptability at Day 14

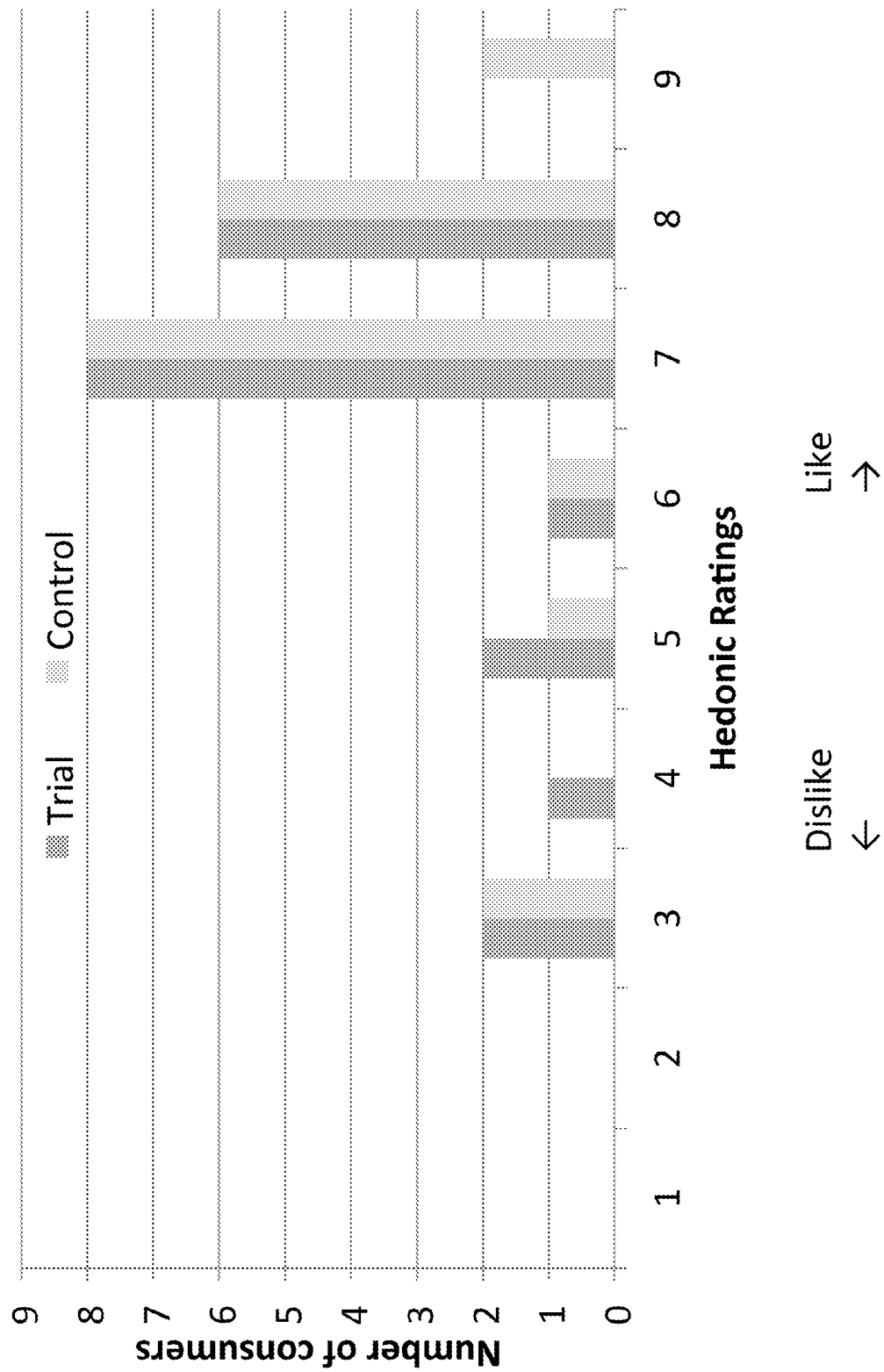
Figure 12. Raw Fry Appearance Acceptability at Day 21

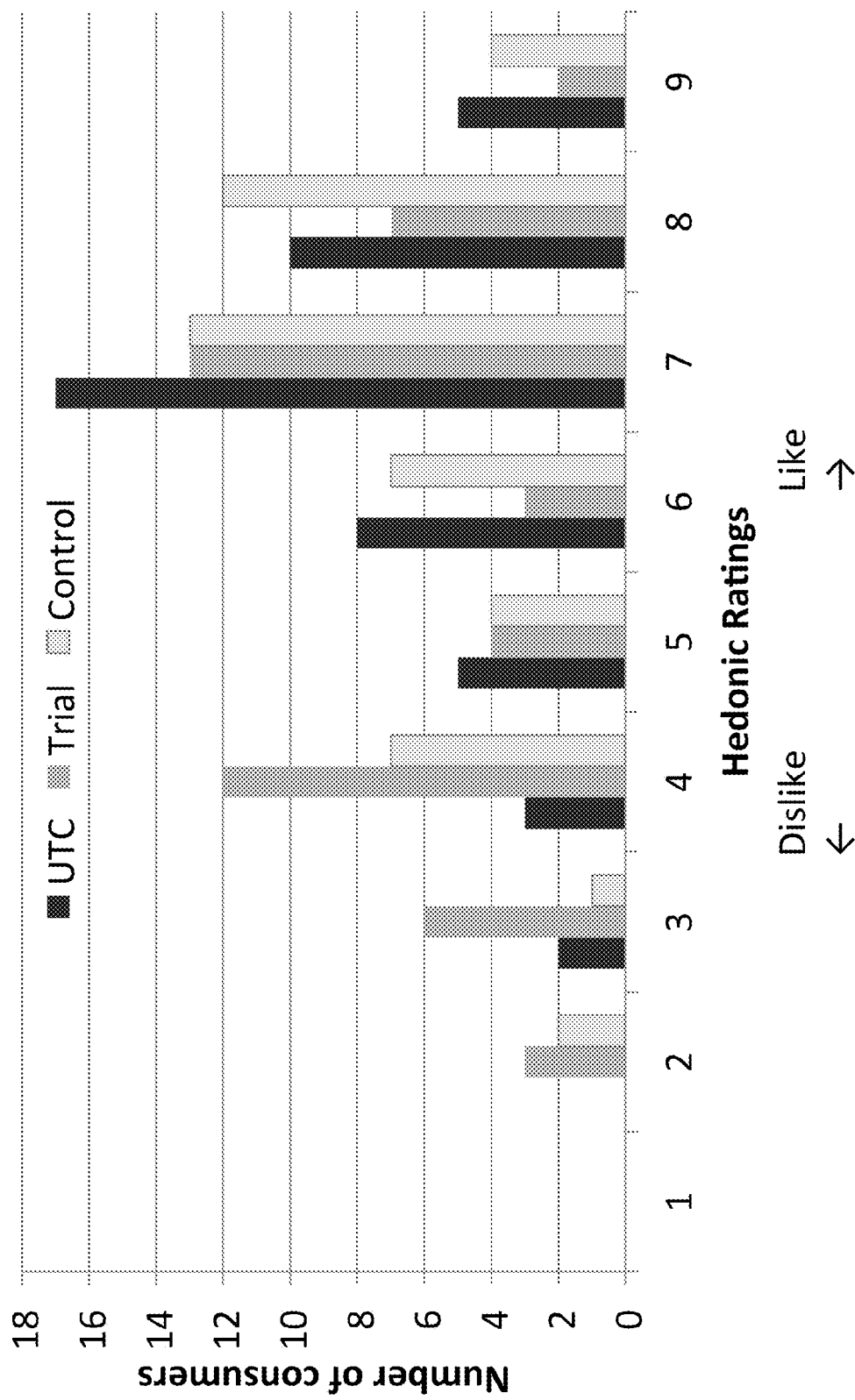

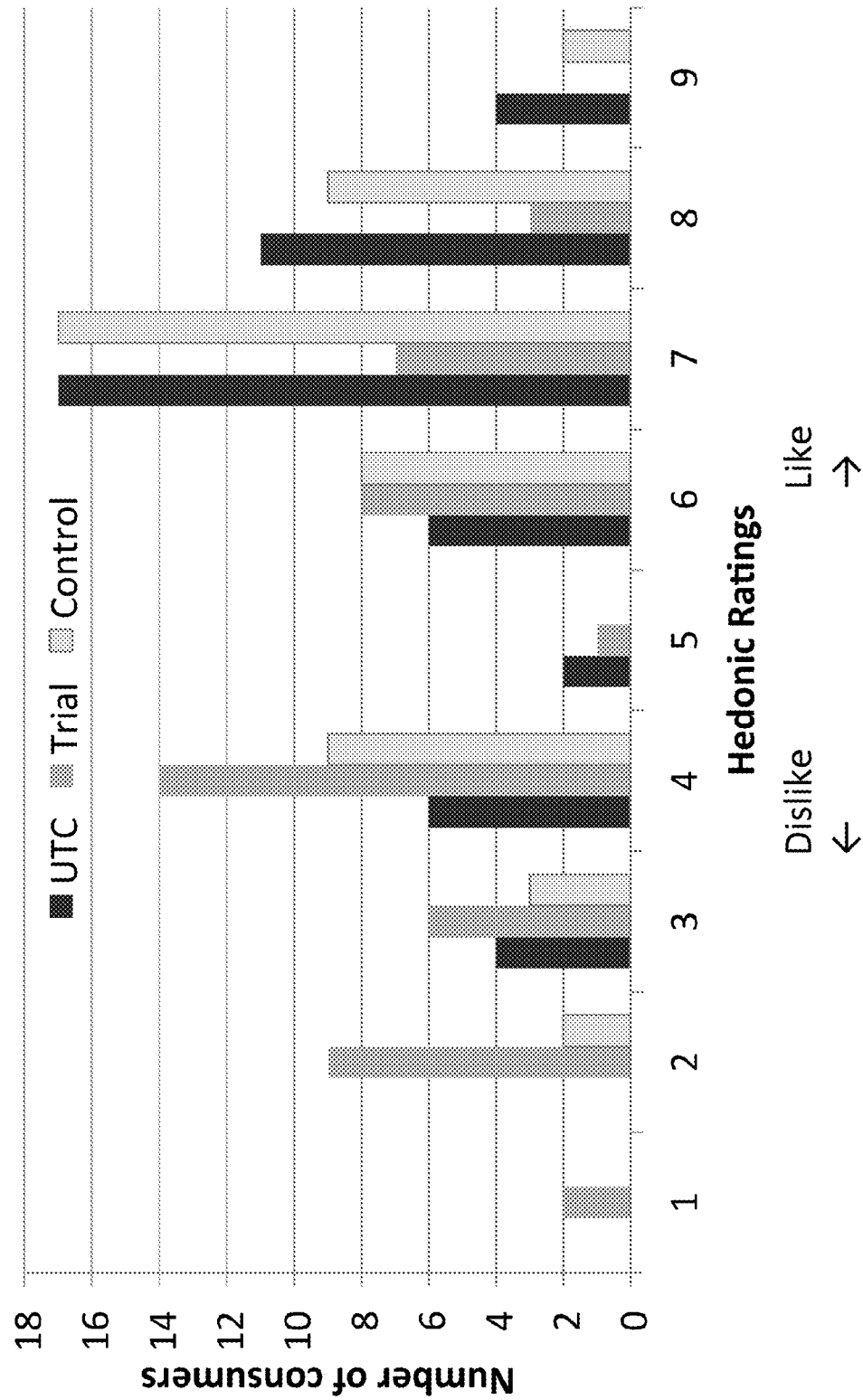

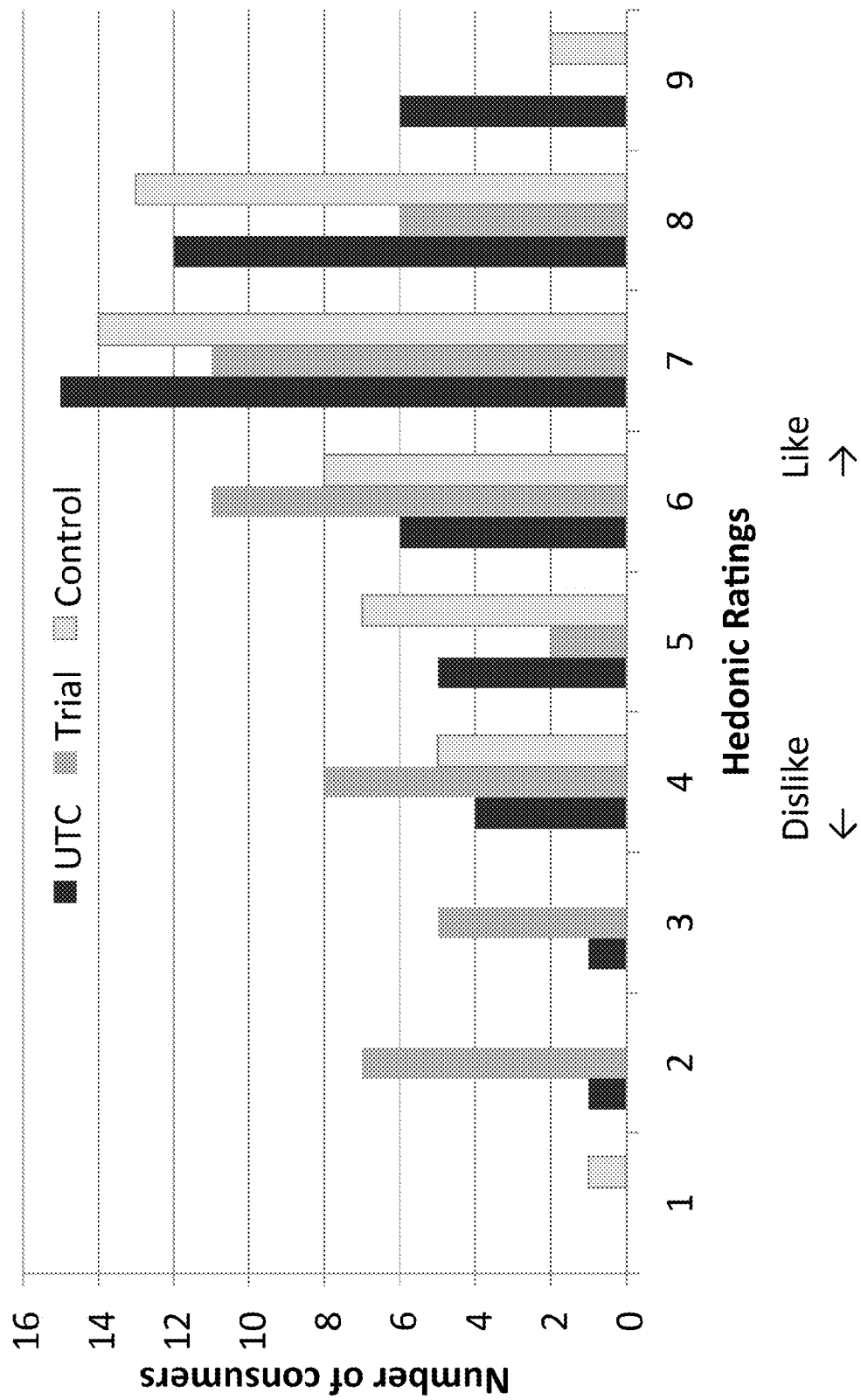

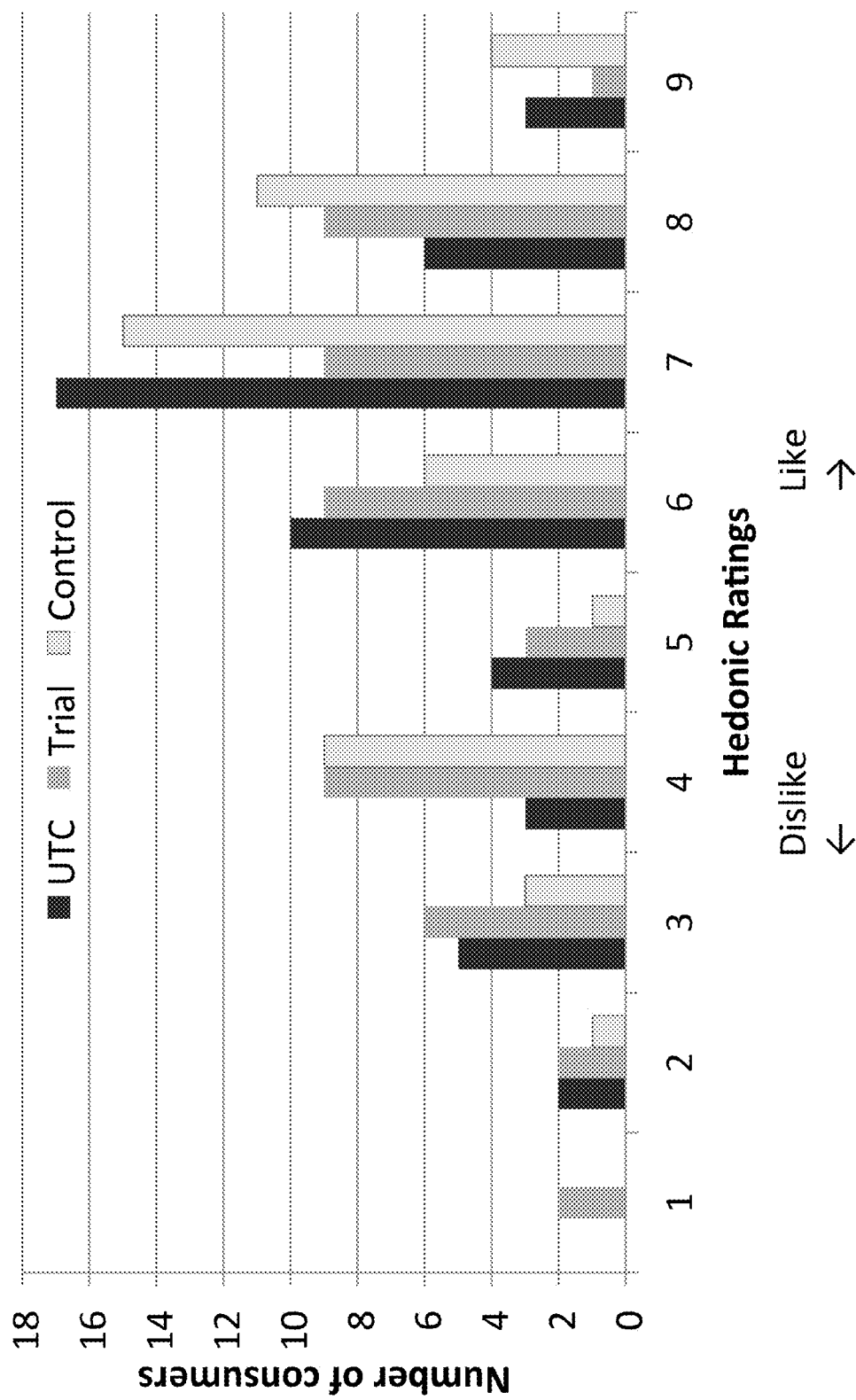

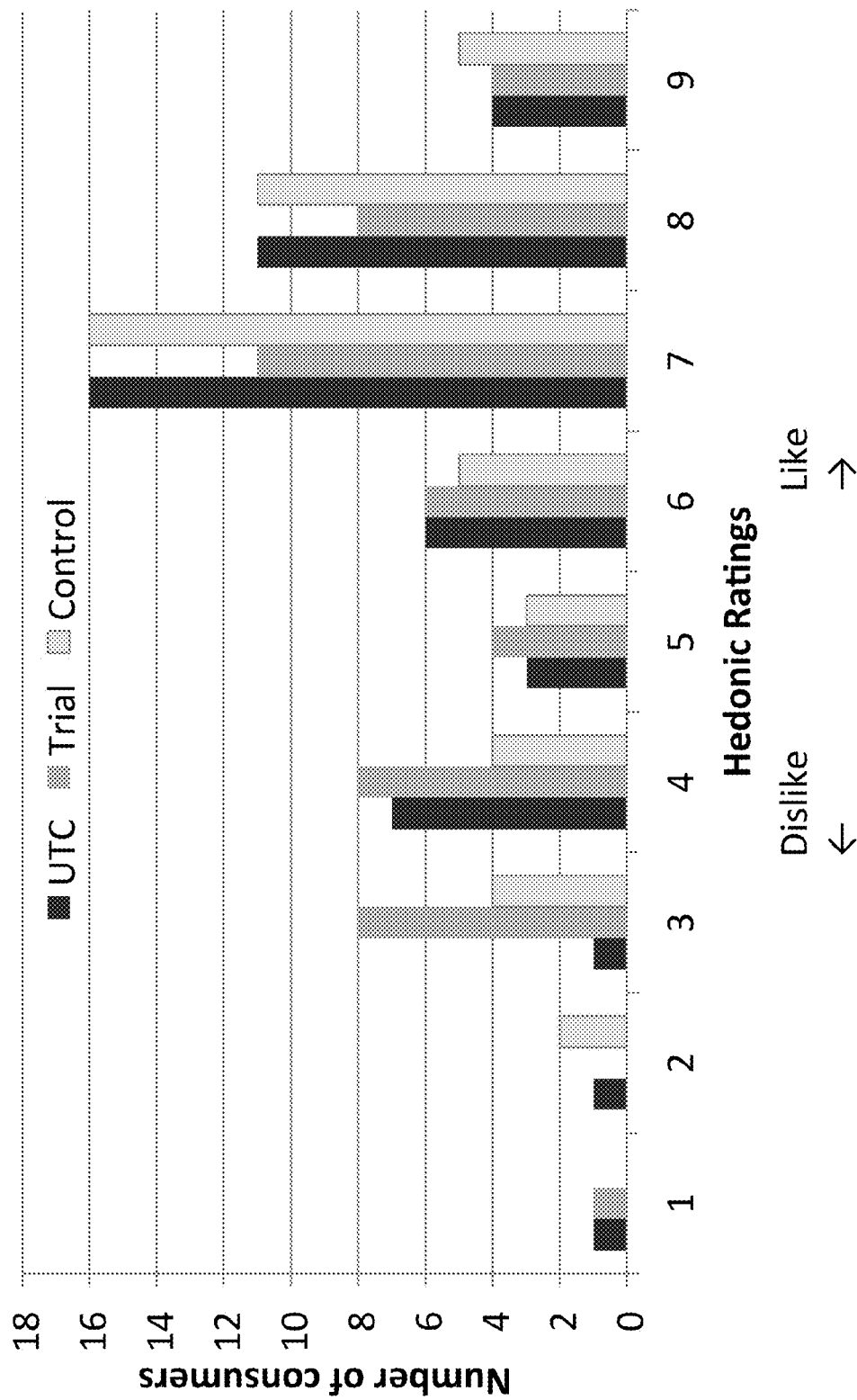
Figure 17. Cooked Fry Texture Acceptability at Day 3

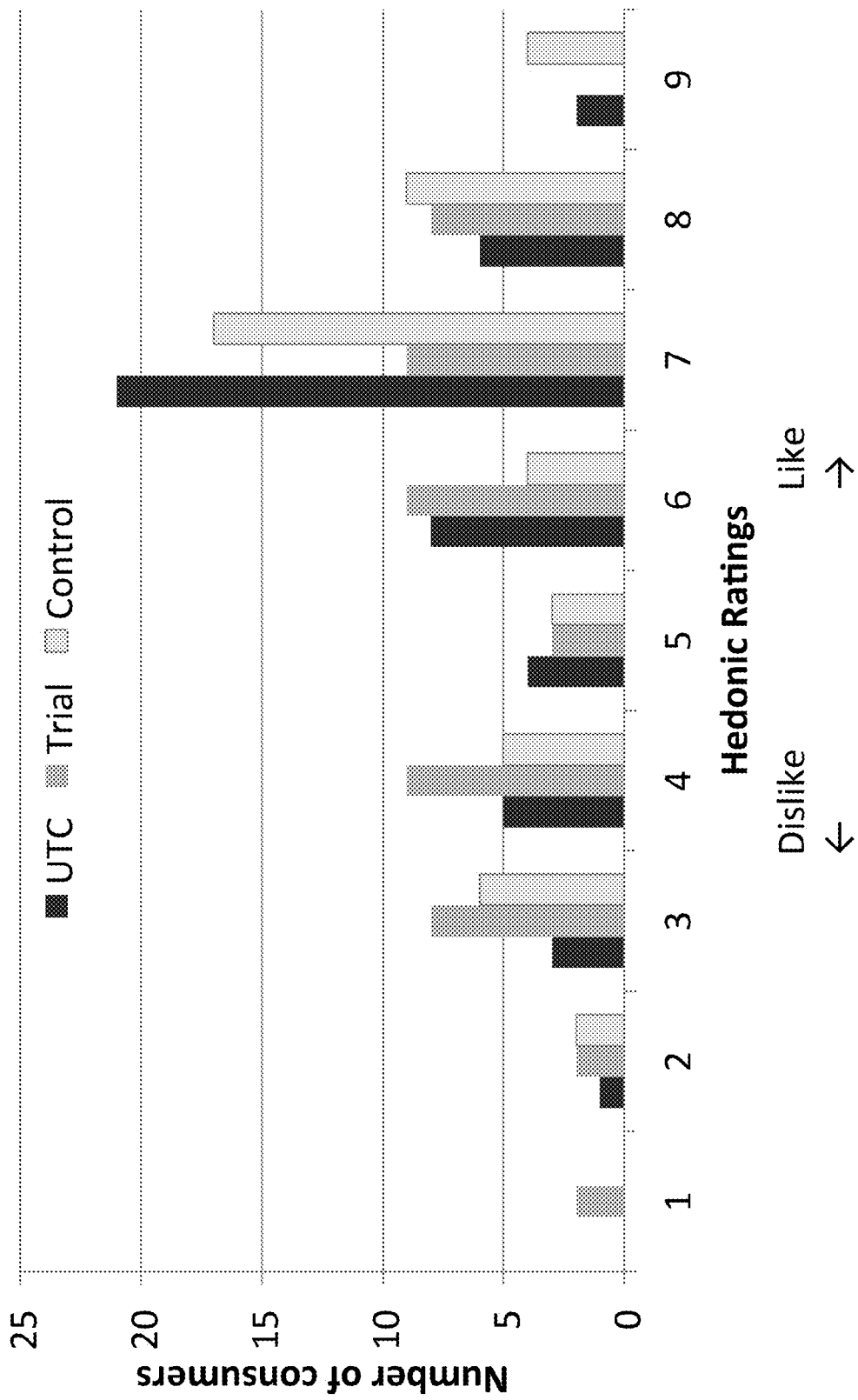

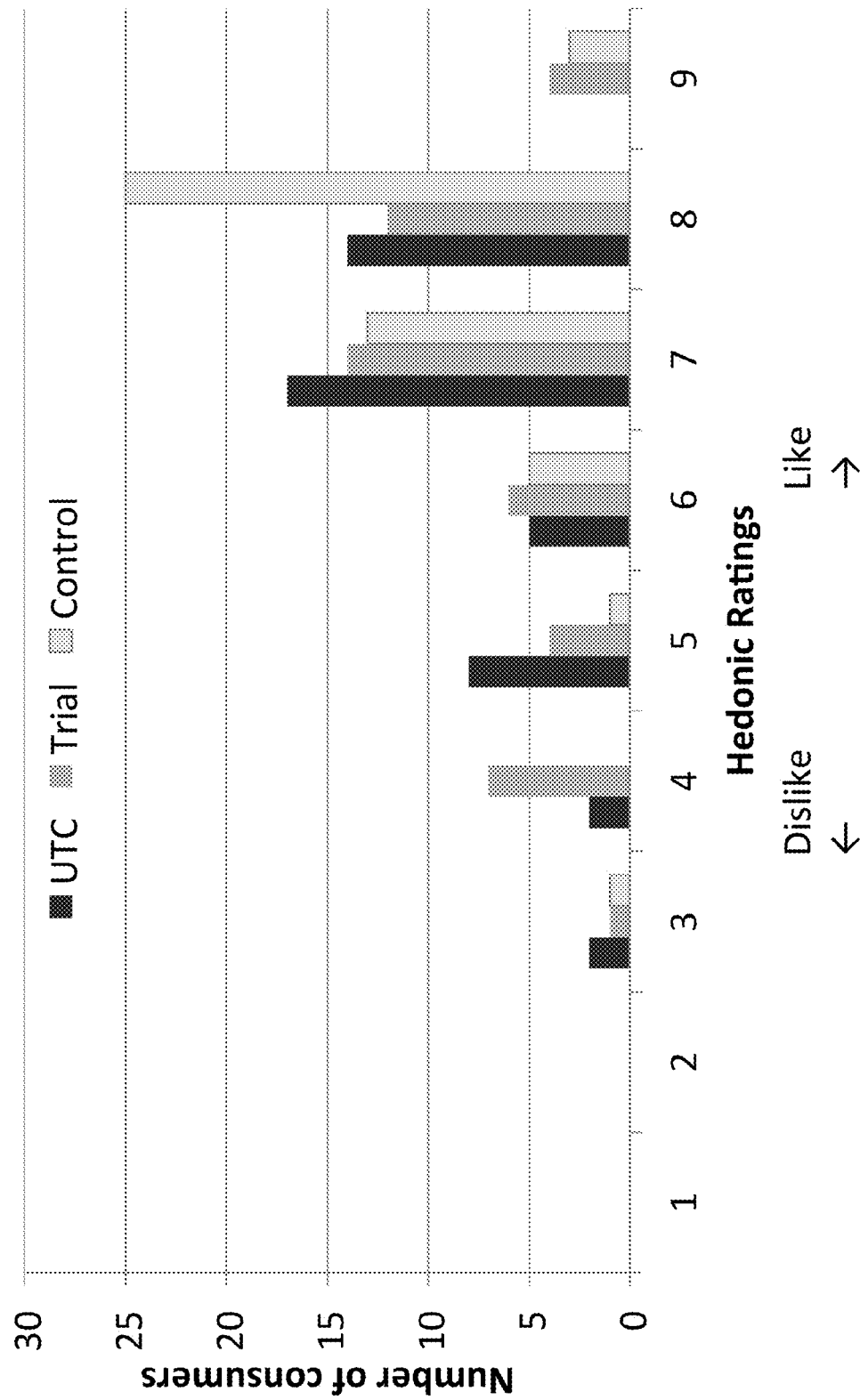
Figure 19. Cooked Fry Color Uniformity Acceptability at Day 7

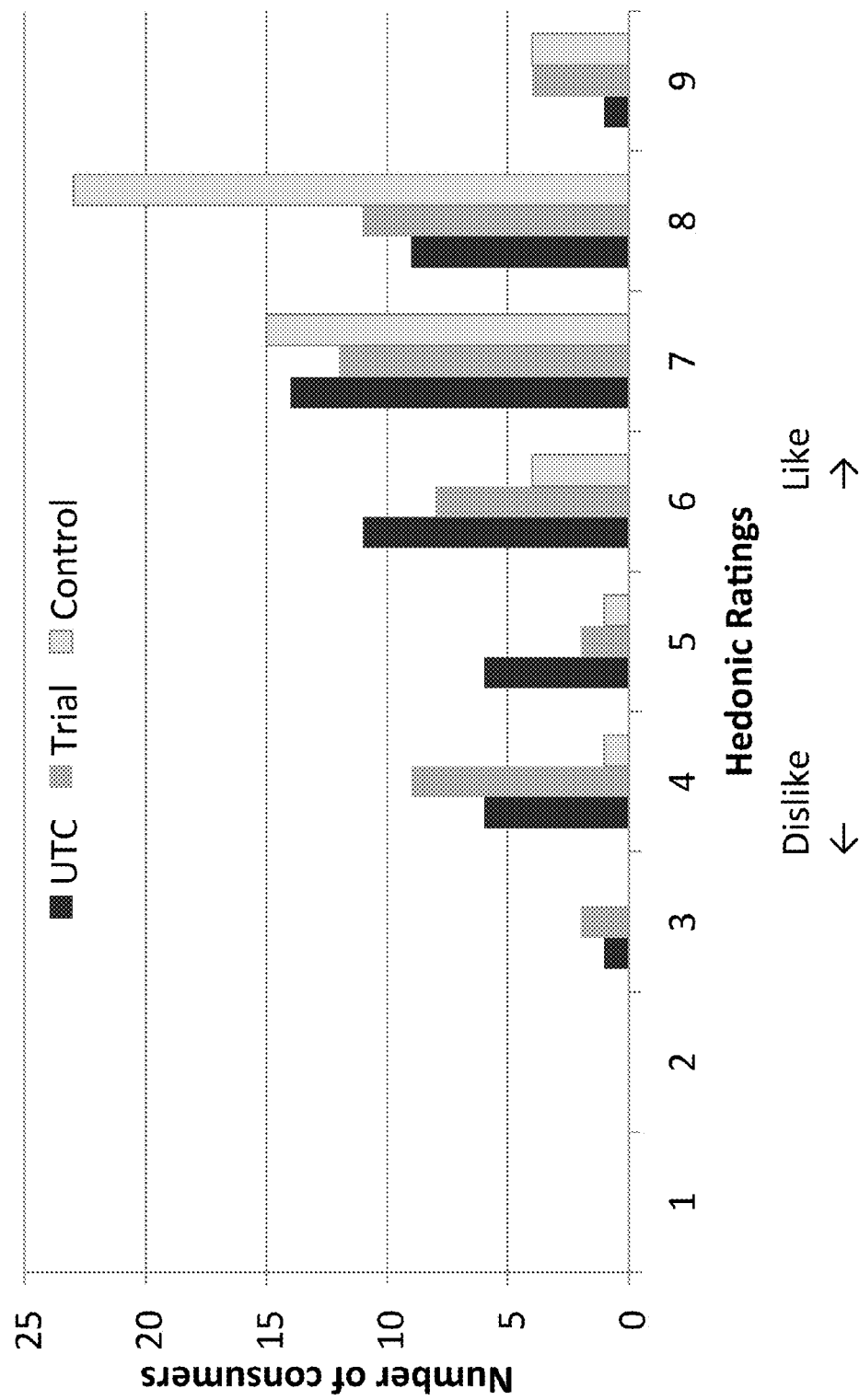

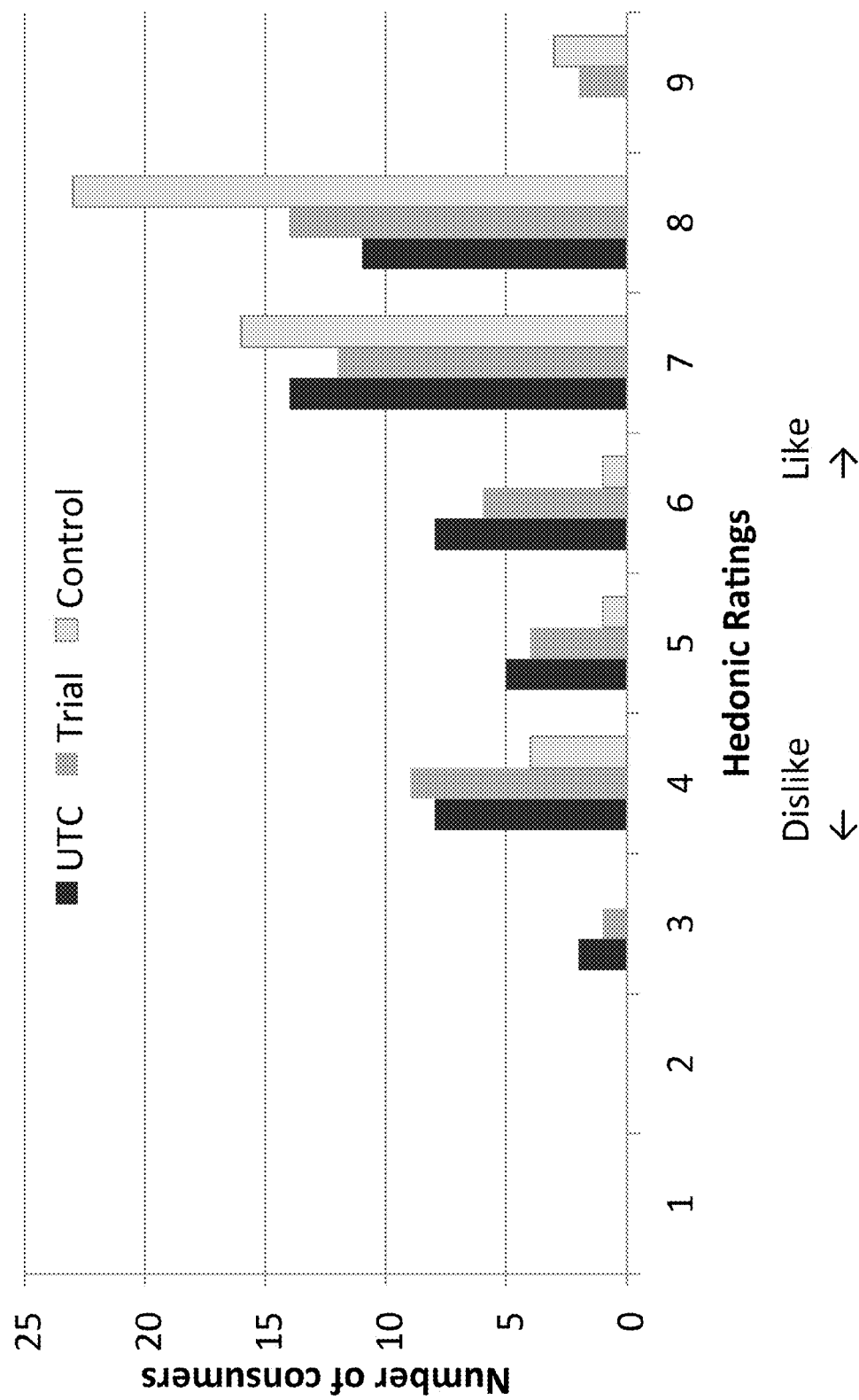

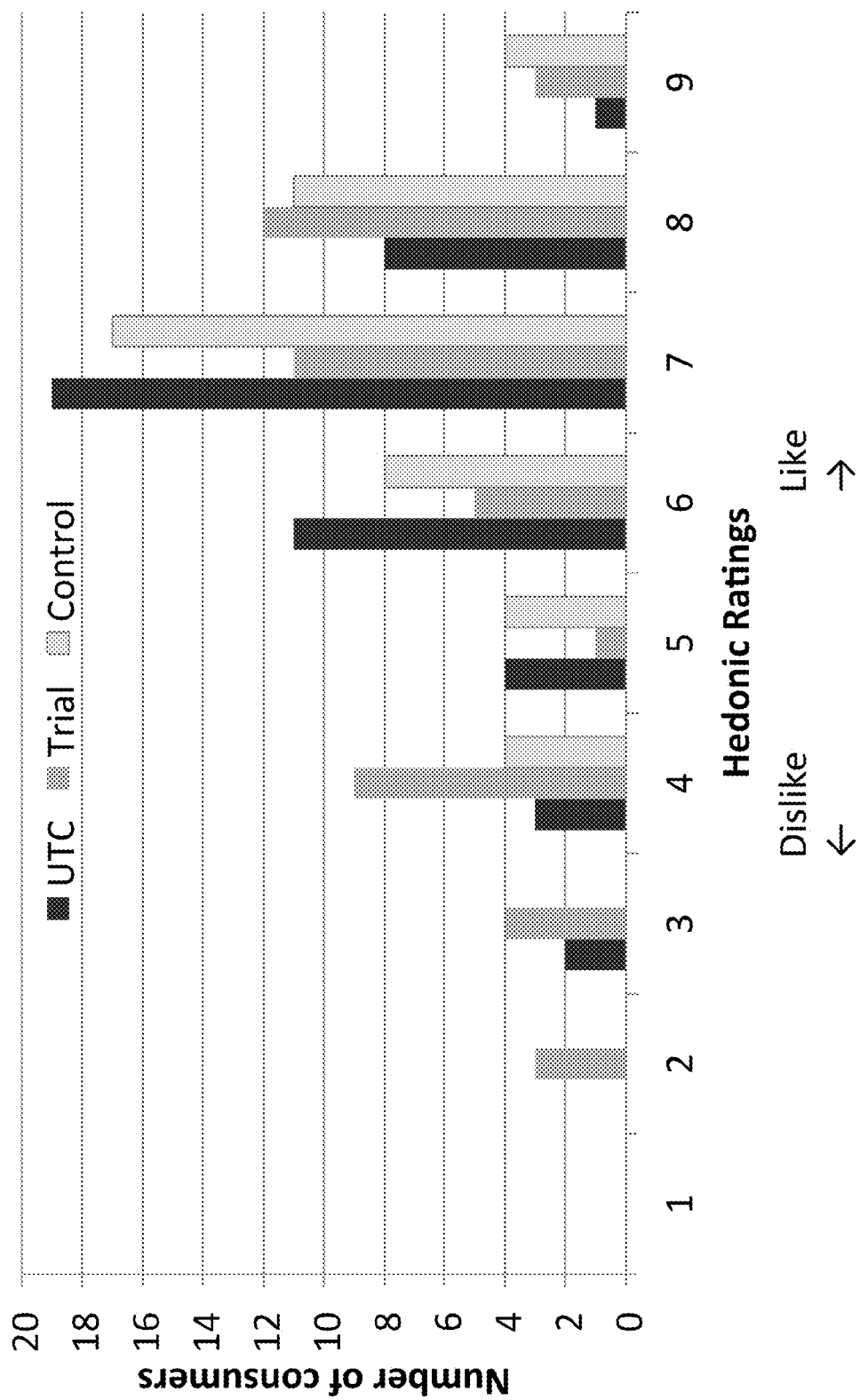

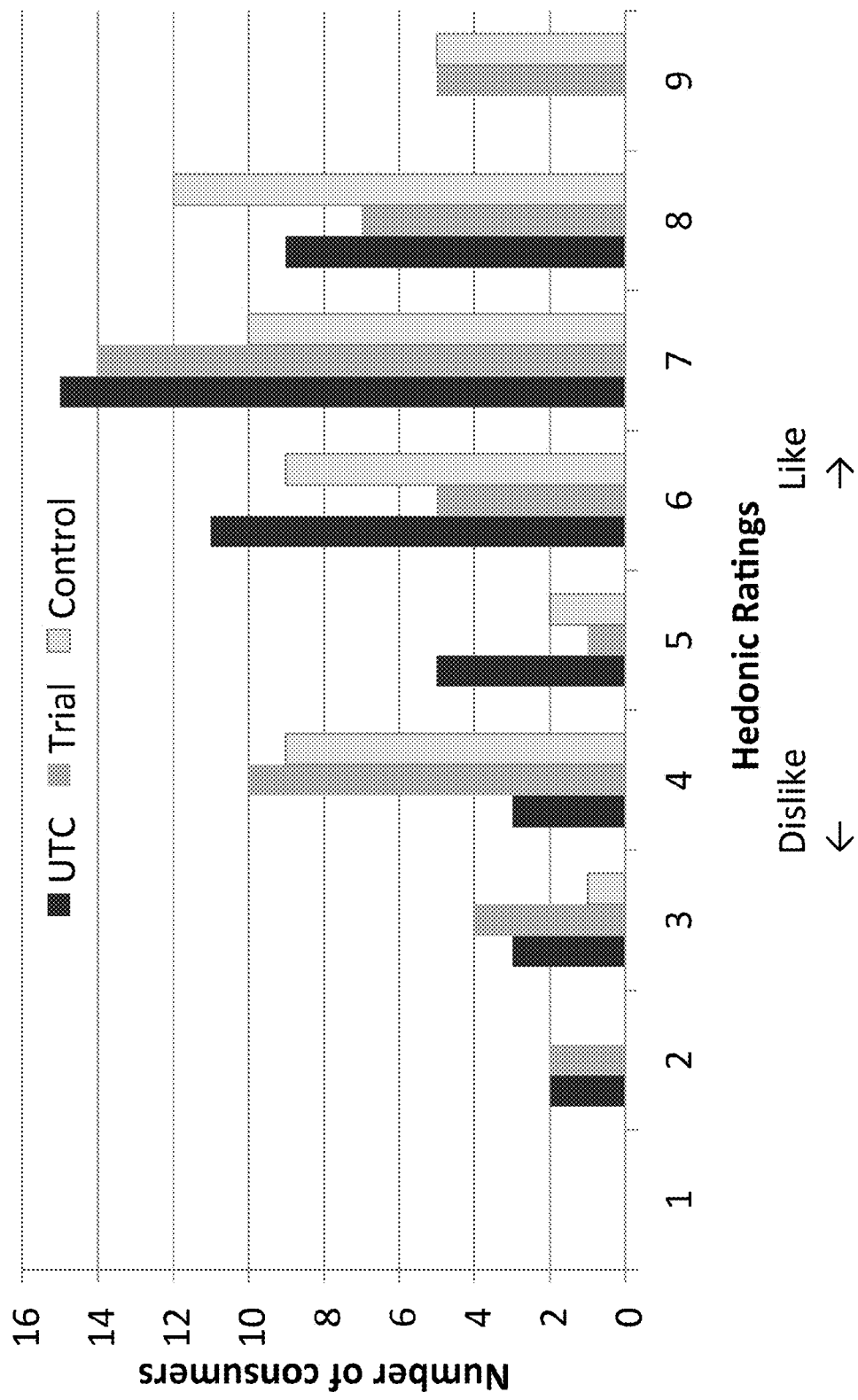

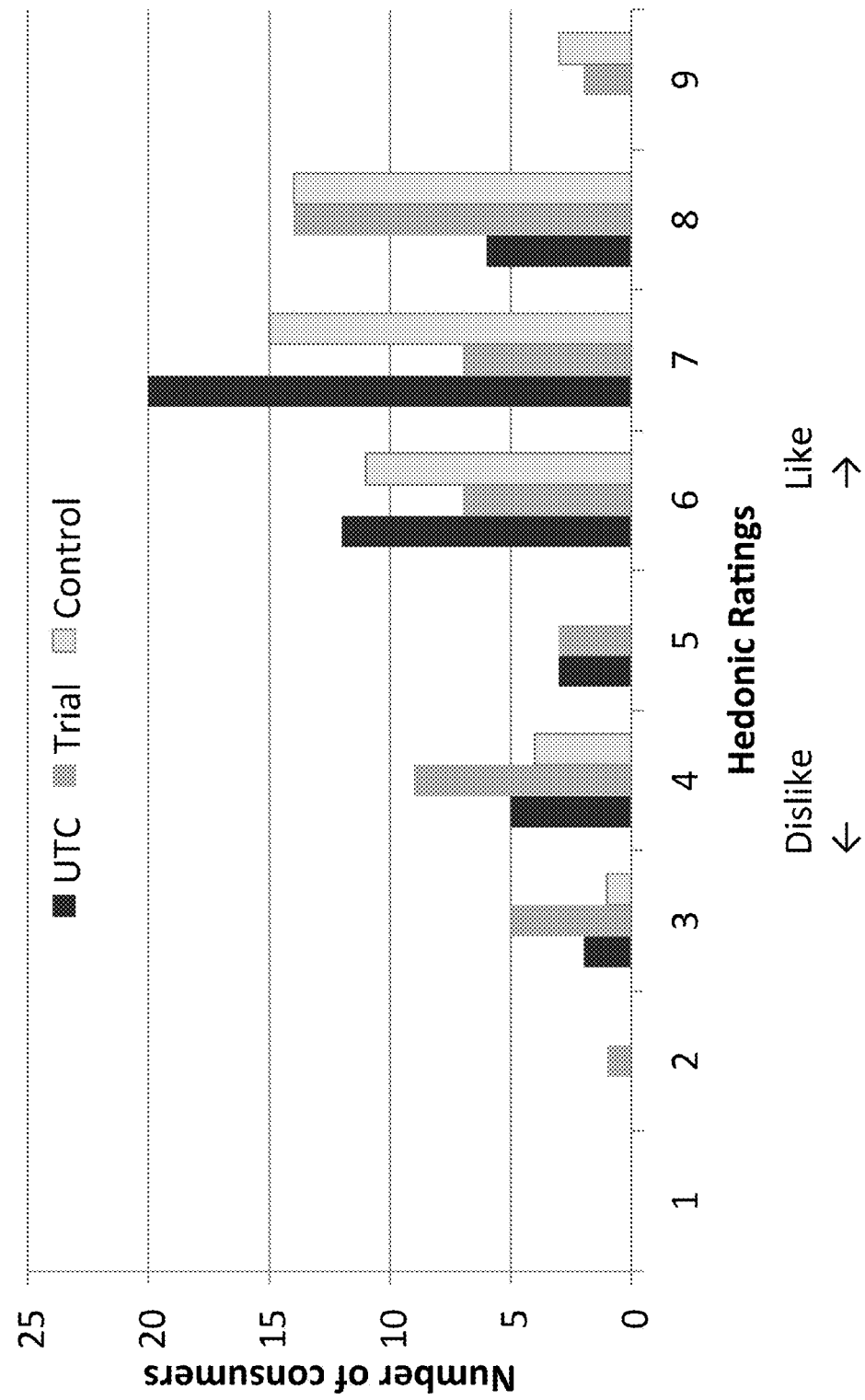
Figure 24. Cooked Fry Overall Acceptability at Day 7

FRESH POTATO PRESERVATIVE AND METHOD OF USING SAME

BACKGROUND OF THE INVENTION

1. Field of the Invention

The present invention relates generally to preservatives for food and more specifically to a preservative that extends the shelf life of fresh cut potatoes by reducing oxidation while preserving texture and flavor.

2. State of the Art

Fresh cut potatoes will rapidly deteriorate once the potatoes are exposed to air. This is particularly apparent when a potato is cut, and within minutes, the potato slices begin to brown. In addition, the flavor, texture, and crispness rapidly degrade and become significantly less appealing to be eaten. As such, it is often the case that fresh cut potatoes are discarded because of their inability to maintain freshness over a relatively short period of time.

Some prior art methods of preserving potatoes includes cooking, which can changes the flavor, appearance and texture, freezing, which affects the texture and crispness, drying, which changes texture, flavor, crispness and appearance, refrigeration, which can help to preserve crispness and flavor but not appearance, the addition of films, which are not desirable to be eaten, and the addition of chemical preservatives, which often significantly and detrimentally change the flavor of the food.

Natural substances such as salt, sugar, vinegar, alcohol, and diatomaceous earth are also used as traditional preservatives. Certain processes such as pickling, smoking and salting can also be used to preserve food but obviously have a significant effect on the flavor.

Ascorbic acid and its sodium, potassium, and calcium salts are commonly used as antioxidant food additives. These compounds are water-soluble and thus cannot protect fats from oxidation: For this purpose, the fat-soluble esters of ascorbic acid with long-chain fatty acids (ascorbyl palmitate or ascorbyl stearate) can be used as food antioxidants. Calcium ascorbate is a compound with the molecular formula $CaC_{12}H_{14}O_{12}$. It is the calcium salt of ascorbic acid, one of the mineral ascorbates.

U.S. Pat. No. 5,645,880 to McArdle, the entirety of which is incorporated by this reference, relates to a food preserving composition containing an acid and a protein-polysaccharide complex (PPC) composition. The PPC includes a water-soluble polysaccharide, such as Guar gum, a water-insoluble protein such as zein and an acid such as citric acid. The polysaccharide is in an amount of between about 90% to 99% of the total PPC composition. The protein is a prolamine such as zein and is in an amount of between about 10% and 1% of the PPC. The acid is in an amount of between about 0.25% to 5% by weight of the total PPC compositions. The acidulant may be added to the water of an aqueous organic solvent system prior to addition of the organic components although it may be added contemporaneously with other organic components. Zein is extracted from corn or maize. PPC compositions containing zein are used to form odorless, tasteless, clear, hard and nearly invisible films. The PPC composition is sold in the market under the trademark ICEIN. ICEIN is provided in a yellow to white free flowing powder and has a pH of 2.6 to 4.0 in a 1% solution I distilled water at 20 degrees Celsius. The PPC of U.S. Pat. No. 5,645,880 is used to preserve food, specifically seafood and dried potatoes and is prepared by dissolving the PPC in an aqueous organic solvent containing alcohol and water in an amount of 100-300 grams of protein per liter of solution.

Among those familiar with the art have used various food preservatives to prevent oxidation. In addition, other food preservatives have included ingredients such as calcium, calcium ascorbate, citric acid, sodium acid pyrophosphate (SAPP), calcium chloride and sodium chloride. Each of these prior art preservatives, however, has a detrimental effect on the flavor of the potatoes and often have limited effectiveness. Accordingly, it would be advantageous to provide a food preservative composition and method of using the composition to preserve fresh cut potatoes that preserves the appearance, color and crispness for a period of days or weeks, and that has either no palatable affect or actually enhances the flavor of the potatoes. The present invention provides a food preservative that includes, inter alia, naturally occurring nutrients in the potatoes to preserve color, taste, texture and shelf life of fresh cut potatoes.

SUMMARY OF THE INVENTION

The present invention pertains to chemical compositions and methods using these compositions for preserving fresh potatoes that extend the shelf life of fresh potatoes, particularly cut fresh potatoes. A fresh potato preservative according to the present invention preserves the texture, flavor, appearance, crispness, and color of the fresh potatoes, particularly the exposed surfaces of fresh cut potatoes. In particular, the present invention provides a chemical composition and method of using the chemical composition for the preservation of food, and in particular, fresh cut potatoes. The composition can be used alone or in conjunction with other methods of food preservation. The composition includes preservatives that act as antimicrobial preservatives, which inhibit the growth of bacteria and fungi, including mold, and antioxidants, such as oxygen absorbers, which inhibit the oxidation of food constituents.

A method and solution of preserving fresh cut potatoes according to the present invention includes a fresh potato preservative solution comprising water, sodium chloride, citric acid, ascorbic acid, calcium chloride, sodium acid pyrophosphate (SAPP), potassium sorbate and a protein-based composition such as a protein-polysaccharide complex, and applying the fresh potato preservative solution to fresh cut potatoes.

In one embodiment the preservative includes sodium chloride in a percentage by weight of 3% to 66.8%, citric acid in a percentage by weight of 0.1% to 73.6%, ascorbic acid in a percentage by weight of 1% to 92.8%, calcium chloride in a percentage by weight of 0.03% to 55.3%, sodium acid pyrophosphate (SAPP) in a percentage by weight of 0.1% to 56.8%, potassium sorbate in a percentage by weight of 0.01% to 44.6% and a protein-based composition in a percentage by weight of 0.001% to 19.5%.

In another embodiment the preservative includes sodium chloride in a percentage by weight of 4.6% to 49.3%, citric acid in a percentage by weight of 3.5% to 58%, ascorbic acid in a percentage by weight of 8.7% to 66%, calcium chloride in a percentage by weight of 0.1% to 36.7%, sodium acid pyrophosphate (SAPP) in a percentage by weight of 2.6% to 39.1%, potassium sorbate in a percentage by weight of 1.8% to 23.5% and a protein-based composition in a percentage by weight of 0.009% to 12.6%.

In yet another embodiment the preservative includes sodium chloride in a percentage by weight of 9% to 33.2%, citric acid in a percentage by weight of 13.5% to 36.3%, ascorbic acid in a percentage by weight of 16.1% to 39.7%, calcium chloride in a percentage by weight of 1.6% to 13.2%, sodium Acid Pyrophosphate (SAPP) in a percentage by weight of 4.5% to 23.2%, potassium sorbate in a percentage by weight of 2.7% to 16.4% and a protein-based composition in a percentage by weight of 0.01% to 5.9%.

In still another embodiment the preservative includes sodium chloride in a percentage by weight of approximately 25.5%, citric acid in a percentage by weight of approximately 24%, ascorbic acid in a percentage by weight of approximately 23%, calcium chloride in a percentage by weight of approximately 12%, sodium acid pyrophosphate (SAPP) in a percentage by weight of approximately 10%, potassium sorbate in a percentage by weight of approximately 5% and a protein-based composition in a percentage by weight of approximately 0.5%.

In yet another embodiment, the protein-based composition is a protein-polysaccharide complex comprised of zein protein, guar gum and an acidulant.

BRIEF DESCRIPTION OF THE DRAWINGS

FIG. 1 is a graph of the number of consumers verses the hedonic ratings for UTC, Trial and Control test samples of raw fry color uniformity acceptability at day 0 according to the present invention.

FIG. 2 is a graph of the number of consumers verses the hedonic ratings for UTC, Trial and Control test samples of raw fry color uniformity acceptability at day 7 according to the present invention.

FIG. 3 is a graph of the number of consumers verses the hedonic ratings for Trial and Control test samples of raw fry color uniformity acceptability at day 14 according to the present invention.

FIG. 4 is a graph of the number of consumers verses the hedonic ratings for Trial and Control test samples of raw fry color uniformity acceptability at day 21 according to the present invention.

FIG. 5 is a graph of the number of consumers verses the hedonic ratings for UTC, Trial and Control test samples of raw fry color uniformity acceptability at day 0 according to the present invention.

FIG. 6 is a graph of the number of consumers verses the hedonic ratings for UTC, Trial and Control test samples of raw fry color uniformity acceptability at day 7 according to the present invention.

FIG. 7 is a graph of the number of consumers verses the hedonic ratings for Trial and Control test samples of raw fry color uniformity acceptability at day 14 according to the present invention.

FIG. 8 is a graph of the number of consumers verses the hedonic ratings for Trial and Control test samples of raw fry color uniformity acceptability at day 21 according to the present invention.

FIG. 9 is a graph of the number of consumers verses the hedonic ratings for UTC, Trial and Control test samples of raw fry appearance acceptability at day 0 according to the present invention.

FIG. 10 is a graph of the number of consumers verses the hedonic ratings for UTC, Trial and Control test samples of raw fry appearance acceptability at day 7 according to the present invention.

FIG. 11 is a graph of the number of consumers verses the hedonic ratings for Trial and Control test samples of raw fry appearance acceptability at day 14 according to the present invention.

FIG. 12 is a graph of the number of consumers verses the hedonic ratings for Trial and Control test samples of raw fry appearance acceptability at day 21 according to the present invention.

FIG. 13 is a graph of the number of consumers verses the hedonic ratings for UTC, Trial and Control test samples of cooked fry color uniformity acceptability at day 3 according to the present invention.

FIG. 14 is a graph of the number of consumers verses the hedonic ratings for UTC, Trial and Control test samples of cooked fry general color acceptability at day 3 according to the present invention.

FIG. 15 is a graph of the number of consumers verses the hedonic ratings for UTC, Trial and Control test samples of cooked fry appearance acceptability at day 3 according to the present invention.

FIG. 16 is a graph of the number of consumers verses the hedonic ratings for UTC, Trial and Control test samples of cooked fry taste acceptability at day 3 according to the present invention.

FIG. 17 is a graph of the number of consumers verses the hedonic ratings for UTC, Trial and Control test samples of cooked fry texture acceptability at day 3 according to the present invention.

FIG. 18 is a graph of the number of consumers verses the hedonic ratings for UTC, Trial and Control test samples of cooked fry overall acceptability at Day 3 according to the present invention.

FIG. 19 is a graph of the number of consumers verses the hedonic ratings for UTC, Trial and Control test samples of cooked fry color uniformity acceptability at day 7 according to the present invention.

FIG. 20 is a graph of the number of consumers verses the hedonic ratings for UTC, Trial and Control test samples of cooked fry general color acceptability at day 7 according to the present invention.

FIG. 21 is a graph of the number of consumers verses the hedonic ratings for UTC, Trial and Control test samples of cooked fry appearance acceptability at day 7 according to the present invention.

FIG. 22 is a graph of the number of consumers verses the hedonic ratings for UTC, Trial and Control test samples of cooked fry taste acceptability at day 7 according to the present invention.

FIG. 23 is a graph of the number of consumers verses the hedonic ratings for UTC, Trial and Control test samples of cooked fry texture acceptability at day 7 according to the present invention.

FIG. 24 is a graph of the number of consumers verses the hedonic ratings for UTC, Trial and Control test samples of cooked fry overall acceptability at day 7 according to the present invention.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention pertains to methods of preserving fresh, that is, uncooked, potatoes with a fresh potato preservative, which extends the shelf life of the fresh potatoes, particularly freshly cut potatoes. The fresh potato preservative preserves the texture, flavor, appearance, crispness and color of the fresh cut potatoes. A method of preserving fresh cut potato pieces according to the present invention uses a combination of known preservatives, naturally occurring nutrients in fresh potatoes and a protein-based composition in the form of a protein-polysaccharide complex (PPC). The PPC may be comprised of zein protein, guar gum and an acidulant.

The method inhibits freshly cut potatoes from browning. For example, fresh cut potatoes are prevented from browning for at least one week or more while maintaining the freshness, crispness, texture, color and flavor of the potatoes without any residual taste. The exact length of the period of preservation depends upon the initial potato quality, the species and the variety of the potato and growing conditions of the potatoes. The period of preservation can also be extended by adding refrigeration to the method. The method of the present invention offers the advantage in that the preserved potatoes may be stored under standard atmospheric pressure and standard atmospheric conditions; that is, the method does not require that the potatoes be stored under vacuum or inert atmosphere. The method of preserving potatoes does not require that the food be cooked, dried or frozen. The method offers the advantage in that it does not require preservatives such as sulfites. However, after the potatoes are preserved with the fresh potato preservative, it may be dried or freeze dried for use as for example food or potpourri; the fresh potato preservative will further delay the browning that eventually occurs in dried and freeze dried potatoes. In the event that such dried or freeze dried potatoes are reconstituted, the potatoes will be less brown than had the potatoes not been preserved with the fresh potato preservative.

In one embodiment the preservative includes sodium chloride in a percentage by weight of 3% to 66.8%, citric acid in a percentage by weight of 0.1% to 73.6%, ascorbic acid in a percentage by weight of 1% to 92.8%, calcium chloride in a percentage by weight of 0.03% to 55.3%, sodium acid pyrophosphate (SAPP) in a percentage by weight of 0.1% to 56.8%, potassium sorbate in a percentage by weight of 0.01% to 44.6% and a protein-based composition in a percentage by weight of 0.001% to 19.5%.

In another embodiment the preservative includes sodium chloride in a percentage by weight of 4.6% to 49.3%, citric acid in a percentage by weight of 3.5% to 58%, ascorbic acid in a percentage by weight of 8.7% to 66%, calcium chloride in a percentage by weight of 0.1% to 36.7%, sodium acid pyrophosphate (SAPP) in a percentage by weight of 2.6% to 39.1%, potassium sorbate in a percentage by weight of 1.8% to 23.5% and a protein-based composition in a percentage by weight of 0.009% to 12.6%.

In yet another embodiment the preservative includes sodium chloride in a percentage by weight of 9% to 33.2%, citric acid in a percentage by weight of 13.5% to 36.3%, ascorbic acid in a percentage by weight of 16.1% to 39.7%, calcium chloride in a percentage by weight of 1.6% to 13.2%, sodium acid pyrophosphate (SAPP) in a percentage by weight of 4.5% to 23.2%, potassium sorbate in a percentage by weight of 2.7% to 16.4% and a protein-based composition in a percentage by weight of 0.01% to 5.9%.

In still another embodiment the preservative includes sodium chloride in a percentage by weight of approximately 25.5%, citric acid in a percentage by weight of approximately 24%, ascorbic acid in a percentage by weight of approximately 23%, calcium chloride in a percentage by weight of approximately 12%, sodium acid pyrophosphate (SAPP) in a percentage by weight of approximately 10%, potassium sorbate in a percentage by weight of approximately 5% and a protein-based composition in a percentage by weight of approximately 0.5%.

Sodium chloride, commonly known as table salt, while having a salty taste is used in the present invention as a preservative to maintain firmness and to enhance the flavor of the potatoes by its salty taste.

The citric acid, such as from lemon or other citrus juice, can inhibit the action of the enzyme phenolase, which turns surfaces of cut potatoes brown. Citric acid helps delay browning in potatoes, but if over used can create a sour taste in the potatoes and also allow the potatoes to lose its crispness.

The ascorbic acid is a sugar acid and is provided for its antioxidant properties and because it is water-soluble. The ascorbic acid may also be in the form of one of its sodium, potassium or calcium salts. Also, the fat-soluble esters of ascorbic acid with long-chain fatty acids (ascorbyl palmitate or ascorbyl stearate) can be used.

The calcium chloride is used as a firming agent and a preservative. It is also used to adjust the pH of the preservative according to the present invention.

The sodium acid pyrophosphate (SAPP) or disodium pyrophosphate helps to maintain the color of the potatoes.

The protein-based composition is provided in the form of a polysaccharide complex (PPC) composition comprised of a water-soluble polysaccharide, a substantially water-insoluble protein and an acid or acidulant. The polysaccharides are water-soluble, and are generally recognized as safe by the U.S. Food and Drug Administration. In general, the water-soluble polysaccharides are plant-derived polysaccharides and related materials such as pectin. Examples of polysaccharides that can be used to prepare the PPC compositions include, but are not limited to water-soluble cellulose derivatives, seaweed polysaccharides such as alginate and carrageenan, seed mucilaginous polysaccharides, complex plant exudate polysaccharides such as gum arabic, tragacanth, guar gum, pectin, ghatti and the like, and microbially synthesized polysaccharides such as xanthan gum. For example, the polysaccharide may be in the form of guar gum, pectin, gum arabic and mixtures thereof.

PPC composition is primarily comprised of the polysaccharide in an amount ranging between about 90% to 99.5% by weight of the total PPC composition. The total PPC composition is defined as the total weight of the protein and polysaccharide components.

The protein can be any protein that is predominately or substantially water-insoluble, however, vegetable proteins are advantageously utilized due to their availability. In general, the vegetable protein is a prolamine. A prolamine is a cereal-derived protein that is insoluble in water, absolute alcohol or neutral solvents and soluble in dilute (80%) alcohol. Suitable examples of prolamines include, but are not limited to, corn-derived prolamine or zein, barley-derived prolamine or hordein and wheat-derived prolamine or gliadin.

The substantially water-insoluble protein is present in an amount ranging between about 0.5% to 10% by weight of the total PPC composition. Ideally, the protein is provided in an amount ranging between about 1% to 5% by weight of the total PPC and is comprised of zein or corn gluten. Zein is extracted from corn or maize.

Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight. Of the eight amino acids that are necessary for protein synthesis in the human body, zein has virtually no lysine or tryptophan. Zein is extracted from corn gluten by physical separation means as opposed to chemical separation means. Whole corn zein contains a heterogeneous mixture of disulfide-linked aggregates. Commercial extraction results in a product with a molecular weight of 25,000 to 35,000. Zein contains a high proportion of hydrocarbon group side chains and has a high percentage of amide groups present with a relatively low amount of free carboxylic acid groups.

The PPC typically has a relatively high pH, which is not necessarily advantageous for a food preservative according to the present invention. As such, food-grade pH adjusting compounds in the form of one or more acidulants, such as ascorbic acid, citric acid and malic acid, are used to maintain a desired pH of the food preserving solution of the present invention. An acid component of the solution to which the PPC is added enhances the water dispersibility of the PPC composition, thereby facilitating reconstitution of the protein-polysaccharide complex composition in water. The acid component is an organic acid, such as $C_1$ to $C_{20}$ organic acids. Suitable organic acids include, but are not limited to: citric acid, malic acid, ascorbic acid and the like and mixtures thereof, as well as salts thereof such as Na, K, and Ca salts. The acidulants employed in the production of the PPC compositions are used in an amount between about 0.25% to 5% by weight of the total PPC compositions during the preparation of the PPC composition.

A PPC composition can be prepared by dissolving the substantially water-insoluble protein or prolamine in an aqueous organic solvent system containing the acidulant to form a protein solution. The soluble polysaccharide is then added to the protein solution and the acidulant is added to form a protein-polysaccharide complex in solution. While the solvent can be separated or evaporated from the solution to yield the final, dry reconstitutable protein-polysaccharide complex (PPC) composition, but the complex may be maintained in solution.

It should be noted that the specifically recited compounds include related salts thereof where applicable, and the recitation of such compounds in the claims is intended to encompass such salts.

A method of preserving fresh cut potatoes according to the principles of the present invention includes the steps of providing a solution of potato preservative comprising water, sodium chloride, citric acid, ascorbic acid, calcium chloride, sodium acid pyrophosphate (SAPP), potassium sorbate and a protein-based composition such as a protein-polysaccharide complex, and applying the fresh potato preservative solution to fresh cut potatoes.

In one embodiment the preservative includes sodium chloride in a percentage by weight of 3% to 66.8%, citric acid in a percentage by weight of 0.1% to 73.6%, ascorbic acid in a percentage by weight of 1% to 92.8%, calcium chloride in a percentage by weight of 0.03% to 55.3%, sodium acid pyrophosphate (SAPP) in a percentage by weight of 0.1% to 56.8%, potassium sorbate in a percentage by weight of 0.01% to 44.6% and a protein-based composition in a percentage by weight of 0.001% to 19.5%.

In another embodiment the preservative includes sodium chloride in a percentage by weight of 4.6% to 49.3%, citric acid in a percentage by weight of 3.5% to 58%, ascorbic acid in a percentage by weight of 8.7% to 66%, calcium chloride in a percentage by weight of 0.1% to 36.7%, sodium acid pyrophosphate (SAPP) in a percentage by weight of 2.6% to 39.1%, potassium sorbate in a percentage by weight of 1.8% to 23.5% and a protein-based composition in a percentage by weight of 0.009% to 12.6%.

In yet another embodiment the preservative includes sodium chloride in a percentage by weight of 9% to 33.2%, citric acid in a percentage by weight of 13.5% to 36.3%, ascorbic acid in a percentage by weight of 16.1% to 39.7%, calcium chloride in a percentage by weight of 1.6% to 13.2%, sodium acid pyrophosphate (SAPP) in a percentage by weight of 4.5% to 23.2%, potassium sorbate in a percentage by weight of 2.7% to 16.4% and a protein-based composition in a percentage by weight of 0.01% to 5.9%.

In still another embodiment the preservative includes sodium chloride in a percentage by weight of approximately 25.5%, citric acid in a percentage by weight of approximately 24%, ascorbic acid in a percentage by weight of approximately 23%, calcium chloride in a percentage by weight of approximately 12%, sodium acid pyrophosphate (SAPP) in a percentage by weight of approximately 10%, potassium sorbate in a percentage by weight of approximately 5% and a protein-based composition in a percentage by weight of approximately 0.5%.

The fresh potatoes are rinsed to reduce or eliminate microorganisms on the surface of the potatoes skin. The potatoes are then processed, such as for example by slicing, dicing, peeling or a combination thereof, and then the potato preservative is applied. The potato preservative is applied by conventional techniques such as spraying, dipping, sprinkling tossing, immersing or drenching. Dipping involves immersing the potatoes into a solution of potato preservative. Good results have been obtained by dipping potatoes about 1-2 minutes.

The potatoes can then be placed in package to prevent or reduce drying where the potatoes are to be transported or sitting on a shelf. However, where the potatoes are to be consumed with several hours from slicing or peeling the potatoes are not packaged. To further reduce microbial growth, when consumption is not to occur for several hours or days, the fresh potatoes should be stored in a refrigerator at a temperature of approximately 34 to 50 degrees Fahrenheit. While the potatoes may be stored at ambient temperatures around 20 degrees C., shelf life is increased by storing below 20 degrees C. The potatoes should also be stored above 0 degrees C. to prevent freezing.

The present invention provides a chemical mixture and resulting solution that increases the stability and shelf life of fresh cut potato pieces. Once potatoes are cut the exposed surfaces are exposed oxygen, the oxygen in the air causes oxidation or browning of the exposed cut surfaces. The present invention provides a chemical solution that counteracts the oxidation process and stabilizes the potatoes preventing browning of the exposed cut surfaces. As a result of being preserved with fresh potato preservative, the degradation of the color of the potatoes are substantially reduced. In addition, the water content or crispness of the potatoes is preserved for an extended period of time.

Several tests were conducted to determine the effectiveness of the preservative of the present invention on fresh cut potatoes, and more specifically, to the effectiveness of the preservative in the taste, texture and appearance of cooked French fries made from the fresh cut potatoes after various lengths of time of storage of the fresh cut potatoes. The tests were conducted by an independent testing laboratory. The cut potato pieces were subjected to various composition solutions according to the present invention and compared to untreated potato pieces. The tests were conducted over a period of three weeks.

The tests were conducted at The University of Maine's Food and Nutrition Pilot Plant and evaluated at their on-site Consumer Testing Center. The experimental controls and conditions are set forth in Table 1

TABLE 1

Conditions for fresh cut potato dip treatments

| Run #s | Identifier | Condition | Composition of 10 liter Dip Solution |
|---|---|---|---|
| 01-09, 28-36 | A | Untreated Control | Water alone |
| 10-18, 37-45 | B | Trial | Water + 6.0% ICEIN |
| 19-27, 46-54 | C | Commercial Control | Water + 0.10% sodium metabisulfite. |

French fries were prepared according to controlled laboratory testing specifications. This included cutting potatoes into French fries having a cross-section of approximately 0.3 to 0.4 inches square, treated with various compositions and observed for a period of twenty-one days. The dry ingredients of the preservative mixtures were mixed with luke warm water and vigorously mixed for 30 seconds and remixed as necessary to maintain the preservative ingredients in suspension. The pH of each solution used in the tests was at approximately 2.3. Each potato in unpeeled form was disinfected prior to cutting or treatment using a solution of 10 ppm chlorine (20 mL 5.25% chlorine bleach per liter of water for 30 seconds. The potatoes were pre-cooled, disinfected and then cut. Pieces from the cut potatoes were then treated in the various solutions set forth in Table 1A and sealed in bags.

The process included:

1. Dipping unpeeled potatoes into disinfecting solution for 30 seconds. Rinse off with clean water.
2. Cutting the potatoes into French fries.
3. Immediately dipping the French fries into treatment for 60 seconds and shaking off excess moisture.
4. Placing the treated French fries in a bag, extracting 80-90% of air from the bag when the bag is sealed and refrigerating the treated French fries, thus using commercial vacuum packaging conditions that closely approximate industry standards.
5. Storing the bagged potatoes in a refrigerated environment (approximately 3 degrees C.) for a predetermined period of time.

After the predetermined period of time, the various fresh cut potato samples were examined and scored. After the predetermined period of time the potato samples were cooked and again examined and scored.

In the following test results, reference herein UTC refers to the untreated control. Control refers to a preservative containing sodium bisulfite. Chemically, sodium bisulfite is a combination of sodium, hydrogen, sulfur and oxygen. It is also called sodium hydrogen sulfate, and is classed as a sulfite, or sulfur-based chemical. Its natural form is a white crystalline powder, but turns yellow in solution. Sodium bisulfite is generally not allowed to be used on fresh produce intended to be served raw. One exception is raw cut potatoes. For example, pre-cut French fries that are later intended to be cooked can be treated with sodium bisulfite. As shown in the test results, raw cut potatoes brown very quickly. The potato industry relies on treating its products with sodium bisulfate as a preservative. Indeed, claims by the potato industry have been made that until a good substitute for sodium bisulfite is found, banning sodium bisulfite would destroy their business. Treated refers to a preservative containing the protein-based ingredient (e.g., Icein) in the form of the preservative according to the present invention. Reference herein to "Icein" refers to the protein-based composition as described herein. Accordingly, potato pieces were either untreated (to provide a first control), or treated with a first and second preservative to provide comparison data in order to be able to determine the effectiveness of the various compositions on preserving fresh cut potatoes.

The Control version of the potato preservative used in the tests included sodium metabisulfite ($Na_2S_3O_5$, also known as preservative E223 by European Union food additive nomenclature) mixed with water in an industry standard concentration.

The Treated version of the potato preservative used in the tests included sodium chloride in a percentage by weight of approximately 25.5%, citric acid in a percentage by weight of approximately 24%, ascorbic acid in a percentage by weight of approximately 23%, calcium chloride in a percentage by weight of approximately 12%, sodium acid pyrophosphate (SAPP) in a percentage by weight of approximately 10%, potassium sorbate in a percentage by weight of approximately 5% and Icein comprised approximately 90% guar gum, 8% zein and 2% citric acid in a percentage by weight of approximately 0.5%.

At various intervals up to twenty-one days, the various bags of cut potato pieces were examined for freshness and discoloration. The results of the evaluations of raw fry appearance acceptability are set forth in FIGS. 1-12. The results of the evaluations of cooked fry overall acceptability are set forth in FIGS. 13-24.

Sensory evaluation was conducted in a consumer testing center under controlled lighting conditions. SIMS sensory software was used to collect data. Raw dipped fries were evaluated by a number of people, shortly after treatment with the preservative of the present invention, and then again at 3, 7, 14, and 21 day intervals while being stored at approximately 4° C. Panelists were asked to indicate how much they liked the uniformity of color, general color and appearance other than color using a standard nine-point hedonic scale first used by Peryam and Pilgrim in 1957. Fries were cooked two days after treatment, and served to another group of consumers. The evaluation was repeated with freshly-cooked fries again one week after treatment. Panelists for the cooked fries were asked to indicate their liking for color uniformity, general color, appearance, taste, texture and overall quality.

Hedonic data were analyzed by analysis of variance using SYSTAT software. Days from treatment and type of treatment were used as factors, and day-by-treatment interaction was evaluated by post-hoc comparisons using Fisher's Least Significant Difference Test, which is a less conservative test. A probability value of 0.05 was selected for determining significant differences.

Each panelist was provided with two ballot for rating the various samples. The first ballot was for rating the properties of uncooked potato samples and the second ballot was for rating the properties of fried potato samples. The voting scale ranged from a low score of 1 to a high score of 9 where 1=dislike extremely, 2=dislike very much, 3=dislike moderately, 4=dislike slightly, 5=neither like nor dislike, 6=like slightly, 7=like moderately, 8=like very much and 9=likely extremely. For the uncooked potato samples, the panelists were asked the following questions:

How much do you like the uniformity of the color of this sample?

How much do you like the general color of this sample?

How much do you like the appearance (other than color) of this sample?

Is there anything else you would like to tell us about this sample? If you refer to other samples in this test, please use the three digit code.

After frying, each of the panelists was asked to evaluate the cooked French fries using the second ballot with the same voting scale 1-9. The second ballot included the following questions:

How much do you like the general color of this sample?
How much do you like the appearance (other than color) of this sample?
How much do you like the taste of this sample?
How much do you like the texture of this sample?
How much do you like this sample overall?

The scores from each ballot were tabulated and provided the following tables.

For fresh cut, uncooked potato pieces, in the form of uncooked French fries, initially, the UTC-treated fries received significantly lower scores for uniformity of color and general color than did the Trial and Control samples; there were no difference in appearance (see Table 2 above). After one week, UTC fries still had very low mean scores for overall acceptability that were significantly lower in all attributes than the other two treatment. Trial and control had mean scores between "like moderately" and "like very much." UTC-treated samples were not evaluated further due to their poor acceptability. The other two treatments scored similarly two and three weeks after treatment. FIGS. 1-12 show the distribution of scores for each treatment per evaluation. There were some significant differences in the

TABLE 2

Sensory Scores for Raw, Dipped French Fries

| | Days since Dipping* | | | | | | | | | | |
|---|---|---|---|---|---|---|---|---|---|---|---|
| | 0 | | | 7 | | | 14 | | | 21 | | |
| Attributes | UTC | Trial | Control | UTC | Trial | Control | UTC | Trial | Control | UTC | Trial | Control |
| Color Uniformity | 4.2 a | 7.7 b | 7.7 b | 3.4 a | 7.2 b | 7.6 b | NA | 7.0 b | 7.7 b | NA | 7.1 b | 7.2 b |
| General Color | 3.4 a | 7.4 b | 7.2 b | 2.5 a | 7.5 b | 7.6 b | NA | 7.0 b | 7.6 b | NA | 6.8 b | 7.3 b |
| Appearance | 6.2 b | 7.3 b | 7.6 b | 3.5 a | 7.5 b | 7.2 b | NA | 6.8 b | 7.8 b | NA | 6.5 b | 7.0 b |

*Mean values in rows followed by different letters are significantly different (p ≤ 0.05, Tukey's HSD test).
NA = indicates that the treatment was not evaluated on days 14 and 21.

TABLE 3A

Sensory Scores for Dipped, Cooked French Fries*

| | Days after Dipping | | | | | |
|---|---|---|---|---|---|---|
| | 3 | | | 7 | | |
| Attributes | UTC | Trial | Control | UTC | Trial | Control |
| Color Uniformity | 6.7 b | 5.5 a | 6.4 b | 6.6 b | 6.6 b | 7.4 c |
| General Color | 6.5 b | 4.4 a | 6.1 b | 6.3 b | 6.4 b | 7.5 c |
| Appearance | 6.7 b | 5.2 a | 6.5 b | 6.2 b | 6.4 b | 7.3 c |
| Taste | 6.1 b | 5.5 a | 6.3 bc | 6.5 bc | 6.0 ab | 6.8 c |
| Texture | 6.4 a | 5.8 a | 6.4 a | 6.1 a | 6.0 a | 6.5 a |
| Overall | 6.2 bc | 5.2 a | 6.2 b | 6.3 bc | 6.0 b | 6.9 c |

*Mean values in rows followed by different letters are significantly different (p ≤ 0.05, Tukey's HSD test).

TABLE 3B

| | Score | Comments Day 21 |
|---|---|---|
| UTC | 3.5 | all surfaces light brown with darker brown edges |
| AF-300 | 1 | all surfaces white with zero browning |
| IC-300 | 2.5 | surfaces starting to brown but less than UTC |
| IC-150 | 2.7 | slightly more browning than IC-300 |
| AF-150 | 1 | all surfaces white with zero browning |
| AF-990 | 1 | all surfaces white with zero browning |
| AF-435 | 1 | all surfaces white with zero browning |
| AF-600 | 1.4 | surfaces generally white but some minor browning beginning to show |
| AF-500 | 1.1 | all surfaces white with a few small brown edges near core |
| AF-925 | 2 | visible browning showing on most surfaces but not mainly near edges |
| AF-750 | 1.1 | all surfaces white with a few small brown edges near core | numbers of very high and very low scores received by the treatments. Initially, UTC-treated fries had significantly more "dislike extremely" and "dislike very much" scores and less "like very much" and "like extremely" scores for uniformity and general color than did the other fries (p≤0.01) (FIGS. 1 and 5). By day 7, UTC-treated samples had significantly more very low scores and fewer high liking scores in all attributes compared to the other treatments (p≤0.001) (FIGS. 2, 6, 10). Control-treated fries had more "like very much" and "like extremely" general colors cores than did the Trial-treated fries (p≤0.05) at day 21 (FIG. 8). Control fries had more high-liking scores for appearance than did Trial-treated fries at day 14 (FIG. 12). Over the three-week period, no changes occurred in acceptability of treatments, with the exception of reduced appearance acceptability for the UTC sample after one week. Liking of the Trial or Control samples did not decrease with time during the study period.

For the cooked potato pieces, in the form of cooked French fries, it was noted that the frying process was likely not optimized. Specifically, the treated potato pieces, treated with the preservative according to the present invention affected the cooking time of the French fries. Specifically, the preservative according to the present invention decreased the cooking time required to achieve adequate cooking of the potato and browning of the exterior surfaces of the French fries. Although all samples were served warm during the evaluation, the number of samples and length of the questionnaire resulted in some samples being cold when evaluated, thus negatively affecting taste and texture acceptability.

The Trial-treated samples cooked three days after dipping had significantly lower scores than any other samples on each testing day for color uniformity, general color, appearance, taste and overall acceptability (see Table 3A). The Trial also received significantly more low scores (dislike extremely and dislike very much) and more low scores for general color and appearance on Day 3, and for taste on day 7 (FIGS. 13-24). Texture was not different among treatments and across serving days. The control-treated sample had higher scores for most attributes than did the other samples, and also had more "like very much" and "like extremely" scores than did the other two treatments for all attributes except taste and texture on Day 7. Taste and overall liking had the highest correlation coefficient (r=0.903), suggesting that when taste was liked, overall liking also increased.

Based on these test results it was found that as the time of storage of raw French fries reached twenty-one days, the French fries treated with the preservative of the present invention containing the protein-based ingredient, had a better appearance than the raw French fries treated without the protein-based ingredient and provided for commercial use of the raw French fries compared to the untreated control raw French fries, which were unusable at twenty-one days. When the French fries were cooked, while the scores of the Trial were generally at least as good as the Control, the discrepancy can be attributed to the fact that the Trial fries cooked significantly faster than the UTC and the Control samples.

The fryer conditions were 365 degrees F. for 7 minutes. It was demonstrated that potatoes treated with the Icein based preservative cooked faster and/or cooked to produce a brown glaze that gave the appearance of being over cooked. In either case, the cooking time can be decreased for potatoes treated with the Icein based preservative of the present invention. By reducing the cooking time in the fryer, a more visually appealing product will result and the texture of the cooked product indicates that the product is indeed adequately cooked. Specifically, by decreasing the cooking time from 7 to 5 minutes, desirable results at least equivalent to the appearance of the UTC and Control samples once cooked were obtained for cooked French fries after seven days of storage of the Icein treated product. This decrease in cooking time is significant for restaurants and other food preparation suppliers in that the time required for cooking is decreased by approximately 29%.

In addition, it was noted that the amount of uptake of oil during the frying process was measurably less for potatoes treated with the Icein based preservative of the present invention (i.e., Trial) than for the UTC potatoes or the Control potatoes. A decrease in the uptake of oil during the frying process results in not only a healthier end product for the consumer but in a significant savings in oil usage by restaurants and manufacturers of fried potato products.

In order to evaluate the oil uptake of the treated and untreated samples, additional testing was conducted. The objective of this trial was to quantify the oil absorption differences among the treatment conditions during deep frying using a mass balance procedure. The expectation was that the ICEIN based preservative of the present invention would provide superior holdout of cooking oil which would offer food processors raw material savings (i.e. less oil) and would give consumers a healthier option (i.e. less fatty French fry).

For each treatment condition, two methods were used to monitor coat weights from the dipping solution. Table 4 shows the results from measuring the net quantity of dipping solution consumed (i.e. the difference in starting versus finish volumes) of each condition. This is the volumetric change based on the amount of coating used in the process of coating a known mass of raw potato slices.

TABLE 4

Summary of coat weights based on the volumetric method, Net drawdown of 10 L dipping solution

|  | Untreated control Water only | Trial 6% ICEIN PS | Commercial control 0.10% metabisulfite |
|---|---|---|---|
| Mass of raw fries (pre-coat), kg | 4.999 | 4.952 | 5.221 |
| Volume of coating remaining mL | n/a2 | 9580 | 9290 |
| Volume of coating consumed, mL | n/a | 420 | 710 |
| Coat weight, wet mL per Kg | n/a | 84.8 | 135.99 |
| Coating pickup, dry gm per Kg | n/a | 5.089 | 0.136 |

The second method to measure coat weights was the difference in pre-coat versus post-coat weights for each set (i.e. package run). Results are shown in Table 5, below.

TABLE 5

Summary of coat weights based on mass balance method Using pre-coat and post-coat weights

|  | Untreated Control Water only | Trial 6% ICEIN PS | Commercial Control 0.10% metabisulfite |
|---|---|---|---|
| Mass of raw fries (pre-coat), kg | 4.999 | 4.952 | 5.221 |
| Gross pickup, wet gm | 14.0 | −26.0 | 30.4 |
| Average coating coverage, wet gm per kg | 0.80 ± 2.5 | −1.40 ± 2.2 | 1.70 ± 3.7 |
| Average coating weight, dry gm per kg | 0.03 | −0.08404 | 0.0017 |

During the pre-trial stage on Feb. 3, 2013, two (2) 50 pounds boxes of large baking potatoes (one box of Idaho Premium Bakers and one box of Colorado Skyline Premium Bakers) were procured in advance from Hannaford Brothers grocery store. Neither store carried two boxes of the same variety; hence, the trial was "blocked" into two phases (See Table A, Appended). Block I, which consisted of package numbers 1-27, contained 'Idaho Bakers' while Block II, which consisted of package numbers 28-54, used the 'Skylines'.

As previously stated, after 21 days, the sensory appearance results from the 20 participants in the consumer Test Center evaluation reported that there were no significant differences between the Trial samples containing Icein and the commercial Control samples for liking of uniformity, general condition and appearance at day 21. In addition, as sown in Table 6, the taste test results indicated that taste of the French fry s were generally as high for the Trial samples as the Control and UTC samples.

TABLE 6

Summary of coat weights based on mass balance method, Using pre-coat and post-coat weights

| Attribute | Untreated Control Water only | Trial 6% ICEIN PS | Commercial Control 0.10% metabisulfite |
|---|---|---|---|
| Uniformity | 6.56 | 6.60 | 7.42 |
| General | 6.29 | 6.42 | 7.46 |
| Appearance | 6.19 | 6.44 | 7.29 |
| Taste | 6.46 | 6.02 | 6.81 |
| Texture | 6.10 | 6.04 | 6.54 |
| Overall | 6.27 | 6.02 | 6.85 |

On Day 7 of the study, an oil uptake experiment was conducted to coincide with the cooking of the French Fries for the scheduled Sensory Taste evaluation at the Consumer Test Center. Approximately 1.6 kilogram (6 vacuum sealed bags) of raw potato were process (fried) each condition.

Table 7 shows the net oil uptake (i.e. consumed) by each treatment condition. Essentially, this is the difference between the starting and ending amounts of oil, taking into account any fugitive losses (i.e. renegade losses per Pilot Plant terminology) and adding those amounts back into the starting amounts in order to accurately account for the 'oil absorption' for each condition.

TABLE 7

Net oil absorption weight by condition, mass balance for cooking oil

| Parameter | Untreated Control Water only | Trial 6% ICEIN | Commercial Control 0.10% metabisulfite |
|---|---|---|---|
| Oil uptake (consumed), gm | 113.4 | 92.0 | 130.7 |

Tables 8-10 below compare and contrast the oil uptake per condition. Table 7 uses the raw (pre-coat) potato weight as its basis for determining oil holdout efficiency.

TABLE 8

Oil uptake results from mass balance study, Basis: Net oil pickup weights per raw potato weight by condition

| Condition | Mass of net oil uptake, gm | Mass of raw potato, kg | gm oil uptake per kg of raw potato, gm/kg | Rate of uptake (oil uptake per raw potato mass), % |
|---|---|---|---|---|
| Untreated Control | 113.4 | 1.687 | 67.2 | 6.7% |
| Trial 6.0% ICEIN PS | 92.0 | 1.595 | 57.7 | 5.8% |
| Commercial Control | 130.7 | 1.754 | 74.5 | 7.5% |

TABLE 9

Oil uptake results from mass balance study, Basis: Net oil pickup weights per fried potato weight (including oil) by condition

| Condition | Mass of net oil uptake, gm | Mass of fried potato including oil, kg | gm oil uptake per kg of fried potato including oil, gm/kg | Rate of oil uptake per fried potato including oil), % |
|---|---|---|---|---|
| Untreated Control | 113.4 | 0.824 | 137.6 | 13.8% |
| Trial 6% ICEIN PS | 92.0 | 0.654 | 140.7 | 14.1% |
| Commercial Control | 130.7 | 0.838 | 160.0 | 16.0% |

TABLE 10

Oil uptake results from mass balance study, Basis: Net oil pickup weights per fried potato weight (excluding oil) by condition

| ICEIN PS trial on Feb. 11, 2013 Condition | Mass of net oil uptake, gm | Mass of fried potato less oil uptake, kg | gm oil uptake per kg of potato less oil uptake, gm/kg | Rate of oil uptake per fried potato less oil uptake), % |
|---|---|---|---|---|
| Untreated Control | 113.4 | 0.711 | 159.5 | 16.0% |
| Trial 6% ICEIN PS | 92.0 | 0.562 | 163.7 | 16.4% |
| Commercial Control | 130.7 | 0.707 | 184.8 | 18.5% |

The ICEIN based preservative met the 21 day shelf life objective at 6.0% solution concentration. The ICEIN based preservative worked on both potato species, including both "Idaho Bakers" and "Colorado Skylines." Based on a panel of 50 human subjects, the ICEIN based preservative yielded comparable taste tests results versus the Controls. Coating pickup results from Table 11 indicate that the potato species (i.e. Idaho Bakers versus Colorado Skyline) effected coating pickup. The Colorado Skyline potato, for example, exhibited significantly higher coating pick-up of the Control dipping solutions.

TABLE 11

Coating Mass Balance data by Potato type and sample

| | Condition A - Water only | | | | Condition B - ICEIN Preservative | | | | Condition C - Sodium metabisulfite | | |
|---|---|---|---|---|---|---|---|---|---|---|---|
| | Pre Coat | Post Coat | Pickup | | Pre Coat | Post Coat | Pickup | | Pre Coat | Post Coat | Pickup |
| Set # | gm | gm | gm | Set # | gm | gm | gm | Set # | gm | gm | gm |
| Dole Premium Idaho bakers | | | | | | | | | | | |
| 1 | 289.9 | 289.3 | −0.6 | 10 | 256.1 | 256.9 | 0.8 | 19 | 216.1 | 219.4 | 3.3 |
| 2 | 299.9 | 301.9 | 2.0 | 11 | 247.5 | 245.1 | −2.4 | 20 | 300.3 | 307.7 | 7.4 |
| 3 | 269.5 | 270.2 | 0.7 | 12 | 304.1 | 302.7 | −1.4 | 21 | 294.3 | 289.5 | −4.8 |
| 4 | 291.9 | 294.4 | 2.5 | 13 | 232.3 | 233.5 | 1.2 | 22 | 301.7 | 304.2 | 2.5 |
| 5 | 252.3 | 251.0 | −1.3 | 14 | 250.5 | 251.4 | 0.9 | 23 | 302.6 | 307.1 | 4.5 |
| 6 | 264.8 | 263.2 | −1.6 | 15 | 262.4 | 258.4 | −4.0 | 24 | 298.7 | 291.1 | −7.6 |
| 7 | 241.7 | 244.3 | 2.6 | 16 | 249.0 | 249.9 | 0.9 | 25 | 304.0 | 304.4 | 0.4 |
| 8 | 294.3 | 291.9 | −2.4 | 17 | 279.1 | 278.4 | −0.7 | 26 | 288.2 | 289.6 | 1.4 |
| 9 | 234.5 | 236.1 | 1.6 | 18 | 241.4 | 240.2 | −1.2 | 27 | 298.3 | 299.2 | 0.9 |
| | Kg | Kg | gm | | Kg | Kg | gm | | Kg | Kg | gm |
| Subt. | 2.439 | 2.442 | 3.5 | | 2.322 | 2.317 | −5.9 | | 2.604 | 2.612 | 8.0 |
| Average | | | 0.4 | | | | −0.7 | | | | 0.9 |
| Std Dev | | | 1.9 | | | | 1.8 | | | | 4.6 |
| Colorado Skyline Premium bakers | | | | | | | | | | | |
| 28 | 273.9 | 276.5 | 2.6 | 37 | 269.0 | 265.7 | −3.3 | 46 | 291.9 | 297.0 | 5.1 |
| 29 | 283.0 | 283.9 | 0.9 | 38 | 254.7 | 247.4 | −7.3 | 47 | 269.7 | 271.7 | 2.0 |
| 30 | 311.2 | 312.8 | 1.6 | 39 | 302.7 | 303.6 | 0.9 | 48 | 300.6 | 302.2 | 1.6 |
| 31 | 294.5 | 296.6 | 2.1 | 40 | 333.0 | 331.4 | −1.6 | 49 | 264.1 | 268.8 | 4.7 |
| 32 | 327.9 | 328.2 | 0.3 | 41 | 310.8 | 308.8 | −2.0 | 50 | 292.8 | 296.6 | 3.8 |
| 33 | 280.8 | 284.9 | 4.1 | 42 | 283.2 | 282.2 | −1.0 | 51 | 339.3 | 337.4 | −1.9 |
| 34 | 229.4 | 232.1 | 2.7 | 43 | 252.2 | 249.2 | −3.0 | 52 | 316.6 | 319.4 | 2.8 |
| 35 | 316.9 | 319.6 | 2.7 | 44 | 298.0 | 297.6 | −0.4 | 53 | 245.6 | 251.2 | 5.6 |
| 36 | 242.3 | 235.8 | −6.5 | 45 | 326.4 | 324.0 | −2.4 | 54 | 296.3 | 295.0 | −1.3 |
| | Kg | Km | gm | | Kg | Kg | gm | | Kg | Km | gm |
| Subt. | 2.560 | 2.570 | 10.5 | | 2.630 | 2.610 | −20.1 | | 2.617 | 2.639 | 22.4 |
| Average | | | 1.2 | | | | −2.2 | | | | 2.5 |
| Std Dev | | | 3.1 | | | | 2.3 | | | | 2.7 |
| Overall composite | | | | | | | | | | | |
| Total | 4.999 | 5.013 | 14.0 | | 4.952 | 4.926 | −26.0 | | 5.221 | 5.252 | 30.4 |
| Std Dev | | | 2.5 | | | | 2.2 | | | | 3.7 |

In 13 of the 18 sets of the ICEIN based preservative coating treatment, the potato slices were lighter following the dipping stage. Notably, a 15 second spin dry stage (using a centrifugal lettuce spinner) was applied to all coated slices under all conditions (i.e. after dipping) in order to remove excess coating prior to re-weighing and packaging. In short, the ICEIN based preservative coated potato slices lost weight. (see Table 12, below).

TABLE 12

Oil absorption data during deep frying by Condition

| | Untreated control | | 6% Icein Preservative | | Commercial control | |
|---|---|---|---|---|---|---|
| | Set # | Weight | Set # | Weight | Set # | Weight |
| Raw potato pre coat, gm | 28 | 273.9 | 16 | 249.0 | 25 | 304.0 |
| Raw potato post coat, gm | | 276.5 | | 249.9 | | 304.4 |

TABLE 12-continued

Oil absorption data during deep frying by Condition

|  | Untreated control | | 6% Icein Preservative | | Commercial control | |
| --- | --- | --- | --- | --- | --- | --- |
|  | Set # | Weight | Set # | Weight | Set # | Weight |
| Coating (pickup), gm |  | 2.6 |  | 0.9 |  | 0.4 |
| Coating (pickup), gm/Kg |  | 9.5 |  | 3.6 |  | 1.3 |
| Fried potato, gm |  | 126.6 |  | 100.0 |  | 142.2 |
| Raw potato pre coat, gm | 29 | 283.0 | 17 | 279.1 | 26 | 288.2 |
| Raw potato post coat, gm |  | 283.9 |  | 278.4 |  | 289.6 |
| Coating (pickup), gm |  | 0.9 |  | −0.7 |  | 1.4 |
| Coating (pickup), gm/Kg |  | 3.2 |  | −2.5 |  | 4.9 |
| Fried potato, gm |  | 136.3 |  | 111.3 |  | 131.4 |
| Raw potato pre coat, gm | 30 | 311.2 | 18 |  |  | 298.3 |
| Raw potato post coat, gm |  | 312.8 |  |  |  | 299.2 |
| Coating (pickup), gm |  | 1.6 |  |  |  | 0.9 |
| Coating (pickup), gm/Kg |  | 5.1 |  |  |  | 3.0 |
| Fried potato, gm |  | 155.4 |  |  |  | 142.6 |
| Raw potato pre coat, gm | 31 | 294.5 | 37 | 269.0 | 46 | 291.9 |
| Raw potato post coat, gm |  | 296.6 |  | 265.7 |  | 297.0 |
| Coating (pickup), gm |  | 2.1 |  | −3.3 |  | 5.1 |
| Coating (pickup), gm/Kg |  | 7.1 |  | −12.3 |  | 17.5 |
| Fried potato, gm |  | 148.4 |  | 112.8 |  | 144.2 |
| Raw potato pre coat, gm | 33 | 280.8 | 38 | 254.7 | 47 | 269.7 |
| Raw potato post coat, gm |  | 284.9 |  | 247.4 |  | 271.7 |
| Coating (pickup), gm |  | 4.1 |  | −7.3 |  | 2.0 |
| Coating (pickup), gm/Kg |  | 14.6 |  | −28.7 |  | 7.4 |
| Fried potato, gm |  | 141.7 |  | 101.2 |  | 131.0 |
| Raw potato pre coat, gm | 36 | 242.3 | 39 | 302.7 | 48 | 300.6 |
| Raw potato post coat, gm |  | 235.8 |  | 303.6 |  | 302.2 |
| Coating (pickup), gm |  | −6.5 |  | 0.9 |  | 1.6 |
| Coating (pickup), gm/Kg |  | −26.8 |  | 3.0 |  | 5.3 |
| Fried potato, gm |  | 115.1 |  | 130.2 |  | 146.5 |
| Total raw potato processed, pre-coat, kg |  | 1687 |  | 1595 |  | 1754 |
| Total fried potato processed, kg |  | 824 |  | 654 |  | 838 |
| % weight loss (raw to fried) |  | 51.2 |  | 59.0 |  | 52.2 |

There appears to be a surface tension phenomenon associated with the ICEIN based preservative coating and its coating mechanism whereby moisture is displaced by the coating. The Colorado Skyline species lost 2.4 times more moisture than the Idaho Bakers. Additional moisture was evident prior to and during the frying work on Day 3 and Day 7. It 'bubbled' more than the Controls when inserted into the 350 deg F. cooking oil. Further, the stored packages of ICEIN based preservative coated potatoes contained more visible liquid than the Commercial Control after 21 days. From the Sensory Appearance evaluations, several comments reported 'more liquid' in the Trial packages as well.

In addition and quite surprisingly, on average, the French fries treated with the ICEIN based preservative reduced oil uptake from about 13.4% to 23.5% in comparison to both the untreated control and the commercial control on a raw potato weight basis, respectively. This is a significant improvement in oil uptake that can significantly reduce French fry production costs of manufacturers of French fries as well as reduce costs for restaurants. In addition, the resulting French fries contain less fat and thus provide a healthier French fry from those produced from fresh cut untreated potatoes or fresh cut potatoes treated with metabisulfite.

Additional studies were also conducted to on an Icein based preservative according to the present invention. The purpose was to quantify the oil uptake and oil holdout differences during deep frying of fresh cut slice potatoes using an Icein based preservative according to the present invention as a pretreatment coating in comparison to untreated- and other traditional treatments (i.e. sodium metabisulfite). The experiment used a mass balance approach to determine oil holdout. Five (5) iterations were run for each condition to develop statistically reliable data. The five (5) conditions included two Controls and three levels of ICEIN based preservative. The procedure consisted of: preparing uniform potato slices for each iteration (approximately 0.350 kg raw potato slices); rinsing them in ice bath; spin drying; weighing them; dipping in the specific treatment(s); spin drying them again for 60 seconds; reweighing; and finally frying them in canola oil for 10 minutes at 350 degree F. followed by a cool period of 10 minutes. The cooled fries were then re-weighed.

Each condition used a dedicated deep fryer (i.e. 5 deep fryers used) and a pre-determined mass of oil at the beginning. At the conclusion of the experiments, the quantity (mass) of oil uptake was determined as the net difference between starting and ending weights of the oil used by each fryer/condition. All sources of oil losses were carefully monitored for mass balance purposes to aid reproducibility and accuracy.

Table 13 contains the average result for the potato weights and coat weights from the summation of the five (5) iterations used in each condition. Notably, the coating pickup is the net amount of ICEIN (or control treatment) applied to the raw potato slices prior to deep frying.

TABLE 13

Summary of potato and coating weights by condition, Mass balance raw data

| Parameter | Condition | | | | |
|---|---|---|---|---|---|
| | Untreated control (water only) | Trial 1 ICEIN PFM 0.25% | Trial 2 ICEIN PFM 0.50% | Trial 3 ICEIN PFM 1.00% | Commercial control (0.10% bisulfite) |
| Initial weight of raw sliced potatoes, (pre-coat & pre-fry), kg | 1.690 | 1.328 | 1.548 | 0.376 | 1.637 |
| Coating pickup (post dip & pre-fry), average net gm | 1.6 | 3.5 | 9.8 | 37.4 | 2.8 |
| Coating pickup standard deviation (post dip & pre-fry), gm | ±1.8 | ±3.3 | ±3.1 | n/a | ±1.2 |
| Gross weight of fried potatoes (post-fry & includes oil uptake), kg | 0.566 | 0.452 | 0.526 | 0.141 | 0.575 |
| Approx. weight loss, (i.e. moisture evap.), % | −66.5% | −66.0% | −66.0% | −62.5% | −64.9% |

Water vapor losses through evaporation are constant between conditions as cooking time and temperature, along with the thickness and uniformity of the fresh cut potato slices are the major driving forces the control evaporation." In other words, weight loss measurements between conditions are a quality control check to gauge stability of slicing and frying conditions. Further, mass losses from evaporation are directly proportional to the initial wet mass of raw potato slices. Therefore, the initial weight of the raw potatoes can be used as basis for comparing oil uptake between conditions and will yield satisfactory results. Other basis were evaluated, however, to confirm this assumption in order to maintain accuracy in this area of study.

The 1.00% ICEIN PFM solution (Trial 3) exhibited high viscosity. The fryer bubbled and 'overflowed' when the raw potato slices were add to it. Because of this, the Condition (i.e. Trial 3) was truncated to just one (1) iteration and the data was recorded. All 'spilled oil' from the overflow was collected with paper towels and accounted for in the mass balance so the results are useable for experimental purposes.

Table 14 shows the net oil uptake (i.e. consumed) by each condition. This is essentially the net difference between the starting and ending amounts of oil, taking into account any fugitive losses (i.e. renegade losses per UMaine terminology) and adding those amounts back into the starting amounts in order to accurately depict or quantify the 'hold-out' for each condition.

TABLE 14

Net oil pickup weight by condition, Mass balance raw data for oil

| Parameter | Condition | | | | |
|---|---|---|---|---|---|
| | Untreated control (water only) | Trial 1 ICEIN PFM 0.25% | Trial 2 ICEIN PFM 0.50% | Trial 3 ICEIN PFM 1.00% | Commercial control (0.10% bisulfite) |
| Oil uptake, gm | 145.8 | 121.8 | 109.5 | 48.0 | 131.2 |

Tables 15-17 (below) compare and contrast the oil uptake per condition. Table 3 uses the raw untreated potato weight as its basis for determining holdout efficiency.

TABLE 15

Oil uptake results from mass balance study at University of Maine
Basis: Net oil pickup weights per raw potato weight by condition

| Condition | Mass of net oil uptake, gm | Mass of raw potato, kg | gm oil uptake per kg of raw potato, gm/kg | Rate of uptake (oil uptake per raw potato mass), % |
|---|---|---|---|---|
| Untreated Control | 145.80 | 1.68980 | 86.3 | 8.60% |
| Trial 1 0.25% ICEIN PFM | 121.80 | 1.32820 | 91.7 | 9.17% |
| Trial 2 0.50% ICEIN PFM | 109.50 | 1.54810 | 70.7 | 7.07% |
| Trial 3 1.00% ICEIN PFM | 48.00 | 0.37570 | 127.8 | 12.78% |
| Commercial Control | 131.20 | 1.63680 | 80.2 | 8.02% |

Table 16 (below) uses the gross fried potato weight as its basis for determining holdout efficiency.

TABLE 16

Oil uptake results from mass balance study at University of Maine, Basis:
Net oil pickup weights per fried potato weight (including oil) by condition

| Condition | Mass of net oil uptake, gm | Mass of fried potato including oil, kg | gm oil uptake per kg of fried potato including oil, gm/kg | Rate of oil uptake per fried potato including oil), % |
| --- | --- | --- | --- | --- |
| Untreated Control | 145.80 | 0.566 | 257.6 | 25.8% |
| Trial 1 0.25% ICEIN PFM | 121.80 | 0.452 | 269.5 | 27.0% |
| Trial 2 0.50% ICEIN PFM | 109.50 | 0.526 | 208.2 | 20.8% |
| Trial 3 1.00% ICEIN PFM | 48.00 | 0.141 | 340.4 | 34.0% |
| Commercial Control | 131.20 | 0.575 | 228.2 | 22.8% |

Table 17 (below) uses the fried potato weight—less the oil pickup—as its basis for determining holdout efficiency.

TABLE 17

Oil uptake results from mass balance study at University of Maine, Basis:
Net oil pickup weights per fried potato weight (excluding oil) by condition

| Condition | Mass of net oil uptake, gm | Mass of fried potato less oil uptake, kg | gm oil uptake per kg of potato less oil uptake, gm/kg | Rate of oil uptake per fried potato less oil uptake), % |
| --- | --- | --- | --- | --- |
| Untreated Control | 145.80 | 0.420 | 347.0 | 34.7 |
| Trial 1 0.25% ICEIN PFM | 121.80 | 0.330 | 368.9 | 36.9 |
| Trial 2 0.50% ICEIN PFM | 109.50 | 0.417 | 262.9 | 26.3 |
| Trial 3 1.00% ICEIN PFM | 48.00 | 0.093 | 516.1 | 51.6 |
| Commercial Control | 131.20 | 0.444 | 295.6 | 29.6 |

The oil uptake results in the Oct. 18, 2012 study for the Untreated Control were 69.8 gm oil uptake per kg of raw potato, versus 86.3 gm oil uptake per kg of raw potato for the Untreated Control.

The results indicate the following:

ICEIN PFM results were encouraging, albeit mixed. The 0.50% ICEIN PFM condition (Trial 2) did show significantly better oil holdout in comparison to the other conditions including the untreated- and commercial-controls. Table 18 below shows a comparison of the results versus the untreated (normal) control using alternate unit basis.

TABLE 18

Oil holdout versus 'unit basis' comparison,
0.50% ICEIN PFM versus Untreated Control

| Basis | Untreated Control gm oil pickup/kg | 0.50% ICEIN PFM gm oil pickup/kg | % Reduction |
| --- | --- | --- | --- |
| Raw untreated potato | 86.3 | 70.7 | 18.1 |
| Fried potato including oil | 257.6 | 208.2 | 19.2 |
| Fried potato excluding oil | 347.0 | 262.9 | 24.2 |

Based on the foregoing test results, it is evident that the protein based potato preservative of the present invention produced unexpected results by preserving the fresh cut potatoes for a period up to 21 days or longer. In addition, other unexpected results were observed for potatoes treated with the protein based preservative, specifically, that cooking time was significantly decreased and oil uptake also decreased considerably.

It would be apparent to those skilled in the art that some other ingredients may be added to the composition of the present invention, including equivalent compounds and substances without departing from the spirit and scope of the present invention. Thus, while there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or substances similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the composition of the invention to achieve those advantages including combinations of ingredients of the various embodiments. Hence, reference herein to specific details of the compositions and function of the present invention is by way of example only and not by way of limitation.

What is claimed is:

1. A method for extending shelf life of fresh cut potatoes, decreasing frying time to cook the fresh cut potatoes and lowering oil absorption during frying of the fresh cut potatoes, comprising:
adding a chemical composition to water to form a solution, the chemical composition comprising:
sodium chloride in a percentage by weight of 3% to 66.8%;
citric acid in a percentage by weight of 0.1% to 73.6%;
ascorbic acid in a percentage by weight of 1% to 92.8%;
calcium chloride in a percentage by weight of 0.03% to 55.3%;
sodium acid pyrophosphate in a percentage by weight of 2.6% to 56.8%;
potassium sorbate in a percentage by weight of 0.01% to 44.6%; and
a protein-polysaccharide composition in a percentage by weight of 0.001% to 19.5%, with the water in an amount so that the protein-polysaccharide composition comprises less than about 1% of the chemical solution; and
immersing fresh cut potatoes in the solution for at least about 1 minute to delay browning and maintain freshness of the fresh cut potatoes during storage of the fresh cut potatoes without significantly affecting taste, to decrease average frying time to cook the fresh cut potatoes and to lower oil absorption during frying of the fresh cut potatoes;
removing the fresh cut potatoes from the solution; and
storing the fresh cut potatoes prior to cooking.

2. The method of claim 1, further comprising providing the sodium chloride in a percentage by weight of 4.6% to 49.3%, the citric acid in a percentage by weight of 3.5% to 58%, the ascorbic acid in a percentage by weight of 8.7% to 66%, the calcium chloride in a percentage by weight of 0.1% to 36.7%, the sodium acid pyrophosphate in a percentage by weight of 2.6% to 39.1%, the potassium sorbate in a percentage by weight of 1.8% to 23.5% and the protein-polysaccharide composition in a percentage by weight of 0.009% to 12.6%.

3. The method of claim 1, further comprising providing the sodium chloride in a percentage by weight of 9% to 33.2%, the citric acid in a percentage by weight of 13.5% to 36.3%, the ascorbic acid in a percentage by weight of 16.1% to 39.7%, calcium chloride in a percentage by weight of 1.6% to 13.2%, the sodium acid pyrophosphate in a percentage by weight of 4.5% to 23.2%, the potassium sorbate in a percentage by weight of 2.7% to 16.4% and the protein-polysaccharide composition in a percentage by weight of 0.01% to 5.9%.

4. The method of claim 1, further comprising providing the sodium chloride in a percentage by weight of approximately 25.5%, the citric acid in a percentage by weight of approximately 24%, the ascorbic acid in a percentage by weight of approximately 23%, the calcium chloride in a percentage by weight of approximately 12%, the sodium acid pyrophosphate (SAPP) in a percentage by weight of approximately 10%, the potassium sorbate in a percentage by weight of approximately 5% and the protein-polysaccharide composition in a percentage by weight of approximately 0.5%.

5. The method of claim 1, further comprising forming the solution comprising approximately a 6% solution of the chemical composition.

6. The method of claim 1, wherein the protein-polysaccharide composition is comprised of zein protein, guar gum and an acidulant.

7. The method of claim 6, wherein the protein-polysaccharide composition comprises-approximately 8% zein protein, 90% guar gum and 2% citric acid.

8. The method of claim 1, wherein the solution is comprised of less than approximately 0.5% of the protein-polysaccharide composition.

9. A preservative, frying time reducer and oil absorption reducer for fresh cut potatoes, comprising:
a chemical solution comprising:
a chemical composition comprising by relative percentages by weight:
sodium chloride in a percentage by weight of 3% to 66.8%;
citric acid in a percentage by weight of 0.1% to 73.6%;
ascorbic acid in a percentage by weight of 1% to 92.8%;
calcium chloride in a percentage by weight of 0.03% to 55.3%;
sodium acid pyrophosphate in a percentage by weight of 2.6% to 56.8%;
potassium sorbate in a percentage by weight of 0.01% to 44.6%; and
protein-polysaccharide composition in a percentage by weight of 0.001% to 19.5%;
and
water in an amount so that the protein-polysaccharide composition comprises less than about 1% of the chemical solution;
whereby the chemical solution increases shelf life, decreases frying time and decreases oil absorption during frying of fresh cut potatoes to which the chemical solution is applied.

10. The preservative, frying time reducer and oil absorption reducer of claim 9, further comprising the sodium chloride in a percentage by weight of 4.6% to 49.3%, the citric acid in a percentage by weight of 3.5% to 58%, the ascorbic acid in a percentage by weight of 8.7% to 66%, the calcium chloride in a percentage by weight of 0.1% to 36.7%, the sodium acid pyrophosphate in a percentage by weight of 2.6% to 39.1%, the potassium sorbate in a percentage by weight of 1.8% to 23.5% and the protein-polysaccharide composition in a percentage by weight of 0.009% to 12.6%.

11. The preservative, frying time reducer and oil absorption reducer of claim 9, further comprising the sodium chloride in a percentage by weight of 9% to 33.2%, the citric acid in a percentage by weight of 13.5% to 36.3%, the ascorbic acid in a percentage by weight of 16.1% to 39.7%, calcium chloride in a percentage by weight of 1.6% to 13.2%, the sodium acid pyrophosphate in a percentage by weight of 4.5% to 23.2%, the potassium sorbate in a percentage by weight of 2.7% to 16.4% and the protein-polysaccharide composition in a percentage by weight of 0.01% to 5.9%.

12. The preservative, frying time reducer and oil absorption reducer of claim 9, further comprising the sodium chloride in a percentage by weight of approximately 25.5%, the citric acid in a percentage by weight of approximately 24%, the ascorbic acid in a percentage by weight of approximately 23%, the calcium chloride in a percentage by weight of approximately 12%, the sodium acid pyrophosphate (SAPP) in a percentage by weight of approximately 10%, the potassium sorbate in a percentage by weight of approximately 5% and the protein-polysaccharide composition in a percentage by weight of approximately 0.5%.

13. The preservative, frying time reducer and oil absorption reducer of claim 9, wherein the chemical solution comprises approximately a 6% solution of the chemical composition.

14. The preservative, frying time reducer and oil absorption reducer of claim 13, wherein the protein-polysaccharide composition comprises zein protein, guar gum and an acidulant.

15. The preservative, frying time reducer and oil absorption reducer of claim 14, wherein the protein-polysaccharide composition comprises approximately 8% zein protein, 90% guar gum and 2% citric acid.

16. The preservative, frying time reducer and oil absorption reducer of claim 9, wherein the chemical solution is comprised of less than approximately 0.5% of the protein-polysaccharide composition.

* * * * *